United States Patent [19]

Bishop et al.

[11] Patent Number: 4,748,637

[45] Date of Patent: May 31, 1988

[54] DIGITAL SUBSCRIBER LOOP TERMINATION DEVICE

[75] Inventors: Larry D. Bishop, Norcross; Larry A. Jackson, Roswell, both of Ga.

[73] Assignee: Conklin Instrument Corporation, Pleasant Valley, N.Y.

[21] Appl. No.: 802,828

[22] Filed: Nov. 29, 1985

[51] Int. Cl.⁴ .......................... H04B 1/38; H04L 5/16
[52] U.S. Cl. .......................................... 375/7; 370/84; 375/25; 375/4
[58] Field of Search .................. 375/4, 7, 25; 370/84, 370/110, 1, 112, 118

[56] References Cited

U.S. PATENT DOCUMENTS 4,578,797 3/1986. Satoh et al. ............................. 370/84
4,620,311 10/1986 Immink ................................ 375/25

OTHER PUBLICATIONS

Bender et al., "Local Distribution System", *The Bell System Technical Journal*, vol. 54, No. 5, May–Jun. 1975, pp. 919–942.

Dunbar et al., "Dataport-Channel Units for Digital Data System 56-kb/s Rate", *The Bell System Technical Journal*, vol. 61, No. 9, Nov. 1982, pp. 2741–2756.

*Primary Examiner*—Robert L. Griffin
*Assistant Examiner*—Wellington Chin
*Attorney, Agent, or Firm*—Bernard, Rothwell & Brown

[57] ABSTRACT

A digital subscriber loop termination device, such as an office channel unit, dataport unit, digital data bank unit or the like, employs a microprocessor for providing data transfer between customer lines and network lines operating at respective different data transmission rates. The microprocessor circuit responds to network sync pulses for providing transfer of network input bytes to customer output generators and for providing for transfer of customer input bytes to network output serial generators. Additionally, the circuit includes facilities for enabling operation at different customer rates.

12 Claims, 28 Drawing Sheets

DIGITAL SUBSCRIBER LOOP TERMINATION DEVICE

TECHNICAL FIELD

The present invention relates to devices such as office channel units, dataport units, digital data bank units, and the like, for terminating subscriber loops employed in synchronous digital data communication systems. The digital subscriber loop termination units connect customer data transmission lines to other equipment, such as local office network equipment, and provide for frequency and format conversion of customer data signals into network or other data signals, and vice versa.

DESCRIPTION OF THE PRIOR ART

Office channel units convert local telephone office data signals having a transmission frequency or bit rate of 64 kb/s (kilobits per second) with a serial binary format of 8 bits per byte or word into customer data signals having a frequency of 56, 9.6, 4.8 or 2.4 kb/s wherein the 56 kb/s customer signal has a bipolar format of 7 bits per byte and the subrate customer signals have a bipolar format of 6 bits per byte. Each customer byte at 56 khz converts into 1 network byte, while subrate customer bytes at 9.6 khz, 4.8 khz and 2.4 khz are converted into 5, 10 and 20 network bytes wherein the second through fifth, tenth or twentieth network bytes are repeats of the first byte.

Dataport units perform functions similar to office channel units except that network input and output signals are bursts of time compressed pulses at a bit rate of 1.544 Mb/s (megabits per second).

Digital data bank units differ from office channel units in that network input and output signals are bipolar, rather than being binary.

Conversion of serial data rates is generally performed by buffers wherein the serial byte to be converted is received at a first rate in a serial-in parallel-out shift register and then transferred to a parallel-in serial-out shift register for transmission at the second rate, with retiming buffers interposed between the registers where necessary to accommodate phase differences between the byte being received and the corresponding byte being transmitted. Additionally, control codes are identified in the signals on the customer lines by means of XOV bipolar violations, while control codes in the network bytes are identified by their eighth bit being equal to zero. Prior art digital subscriber loop termination devices utilized extensive logic gate circuits for recognizing control codes and providing the corresponding code conversions.

SUMMARY OF THE INVENTION

The invention is summarized in a digital subscriber loop termination device employing a microcomputer connected to the input and output shift registers of both the customer and network lines for reading the network input word from the network input register, passing the network input word as a customer ouput word to the customer output register, reading the customer input word from the customer input register, and passing the last read customer input word as a network output word to the network output register. The writing of the last customer input word to the network output register is synchronized with a network system byte clock, while the reading of input registers and the writing to the customer output register is performed at the customer byte transmission rate.

An object of the invention is to construct an office channel unit which offers substantial improvements by being less expensive, having less complexity, and offering more design flexibility.

Another object of the invention is to utilize microcomputer technology to replace extensive logic circuitry.

One advantage of the invention is that a single computer circuit can provide for conversion and transfer of serial data signals in two directions.

Another feature of the invention is that bipolar code violations are detected by logic circuitry to produce a bit indicator in a customer input register for recognizing control codes. Computer synchronization is provided by a data network system clock, while synchronization with customer subrates is provided by counting of system clock cycles. Control code conversion is conducted by software tables; thus, control codes can be changed or new codes can be added without hardware changes.

Other objects, advantages and features of the invention will be apparent from the following description of the preferred embodiment taken in conjunction with the accompanying drawings.

DESCRIPTION OF THE PREFERRED EMBODIMENTS

Figure 1:
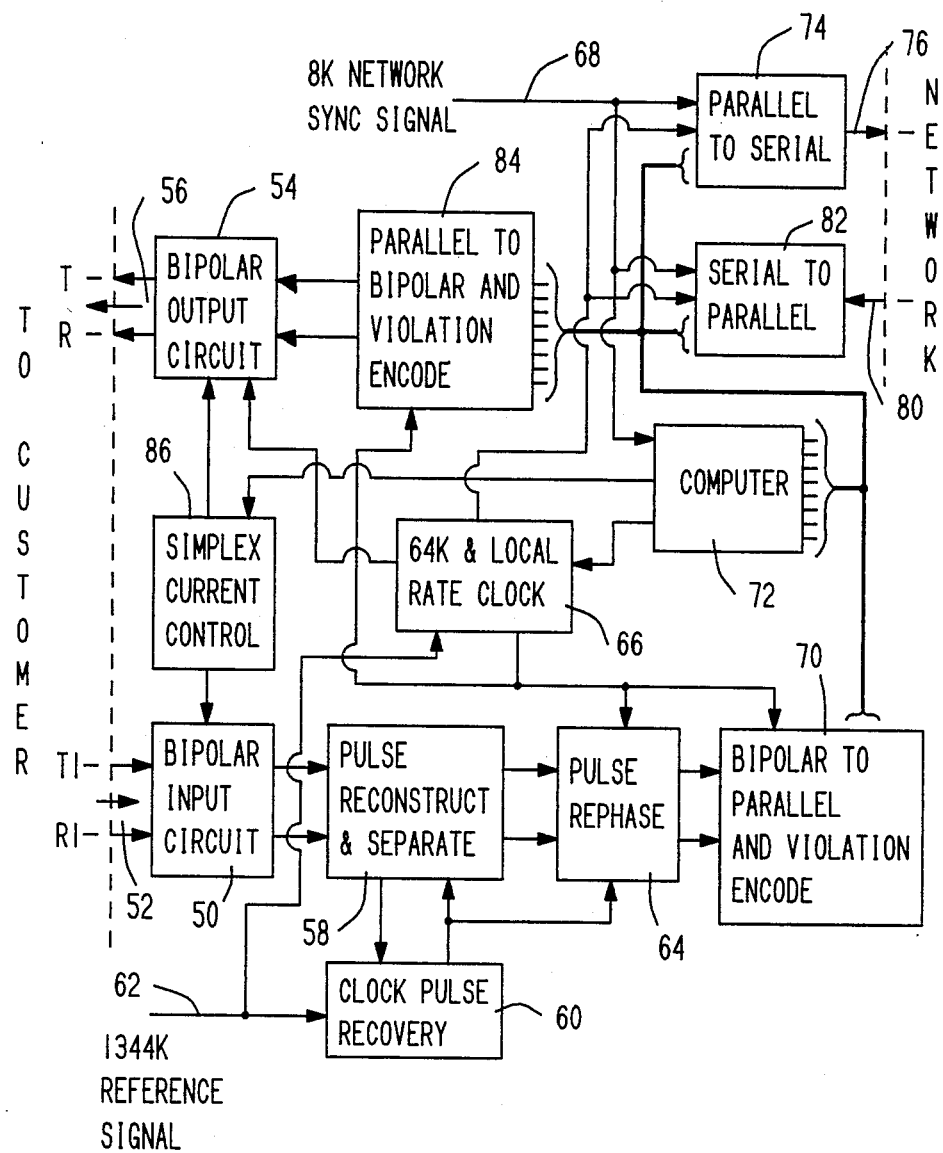
FIG. 1 is a block diagram of an office channel unit in accordance with the invention.

An office channel unit, illustrating one preferred embodiment of the digital subscriber loop termination device in accordance with the invention, is illustrated in the drawings and is described in detail hereafter. The digital subscriber loop termination device in accordance with the invention can also be embodied in other units or circuits including dataport units, digital data bank units, and the like, wherein frequency and format conversions are performed when serial data signals from customer input lines and network input lines are applied to network output lines and customer input lines, respectively.

The office channel unit illustrated in FIG. 1 is located at a local telephone or digital data carrier office for converting serial customer data signals into serial network data signals and for converting serial network data signals into serial customer data signals. The office channel unit has an input circuit 50 connected to the customer input lines 52 and has an output circuit 54 connected to the customer output lines 56 wherein the input and output lines 52 and 56 form the four wire transmission lines to the customer location. The data signals on the lines 52 and 56 are conventional bipolar signals of 56, 9.6, 4.8 or 2.4 kilobits per second. The incoming customer signals are passed to a pulse reconstruction and separation circuit 58 wherein the pulse signal is amplified and separated into separate binary signals containing the respective positive and negative pulses of the bipolar signal. A clock pulse recovery circuit 60 utilizes binary signals from the pulse reconstruct and separation circuit 58 to produce a clock pulse from a 1344 khz reference signal on line 62 from the local office sync and timing signal circuitry to aid in the accurate generation of the rail signals in circuit 58. A pulse rephasing circuit 64, also utilizing the recovered clock signal from circuit 60, delays each binary pulse from circuit 58 to coincide with a local rate clock signal from clock circuit 66 which is synchronized with the 8 khz sync signal on line 68 from the telephone network timing circuit. The rephased binary signals of the bipolar customer input are converted to parallel signals and decoded for XOV bipolar violation in circuit 70, the bipolar violation being expressed in the parallel signal by the eighth bit of the signal. A computer circuit 72 synchronized with the network sync signal on line 68 reads the parallel signal 70, at a rate corresponding to the customer byte transmission rate and passes the parallel signal to a parallel to serial circuit 74 which is operated by the network sync signal on line 68 and the 64 KHz clock signal from circuit 66 to generate outgoing binary signals on line 76 in the local area network format. The computer 72 also recognizes the eighth bit indication of a control code in the byte from circuit 70 and utilizes a memory table to convert the control code into the corresponding code required in the network signal prior to passing the byte to the circuit 74.

Serial binary signals from the network are received on line 80 by a serial to parallel converting circuit 82 which is then read by the computer 72 in synchronism with the 8 KHz network sync signal 68. Data bytes are transferred by the computer 72 to a parallel to bipolar conversion and violation encoding circuit 84 which generates a pair of binary signals corresponding to the desired outgoing positive and negative bipolar pulse signals for driving the bipolar output circuit 54 at the local rate clock from circuit 66. Control codes and a zero code received from the circuit 82 by the computer 72 are recognized and converted into codes which produce bipolar violations in circuit 84. Customer service unit and data service unit loopback codes are recognized by the computer 72 which operates simplex current control 86 which change the DC bias applied to lines 52 and 56 to operate a loopback circuit in a conventional customer service unit (not shown) or conventional data service unit (not shown) at the customer premises.

For dataport or digital data bank units, the circuits 74 and 82, are modified to provide for network signals at 1.544 Mb/s time compressed bursts or at 64 kb/s bipolar format.

Figure 3:
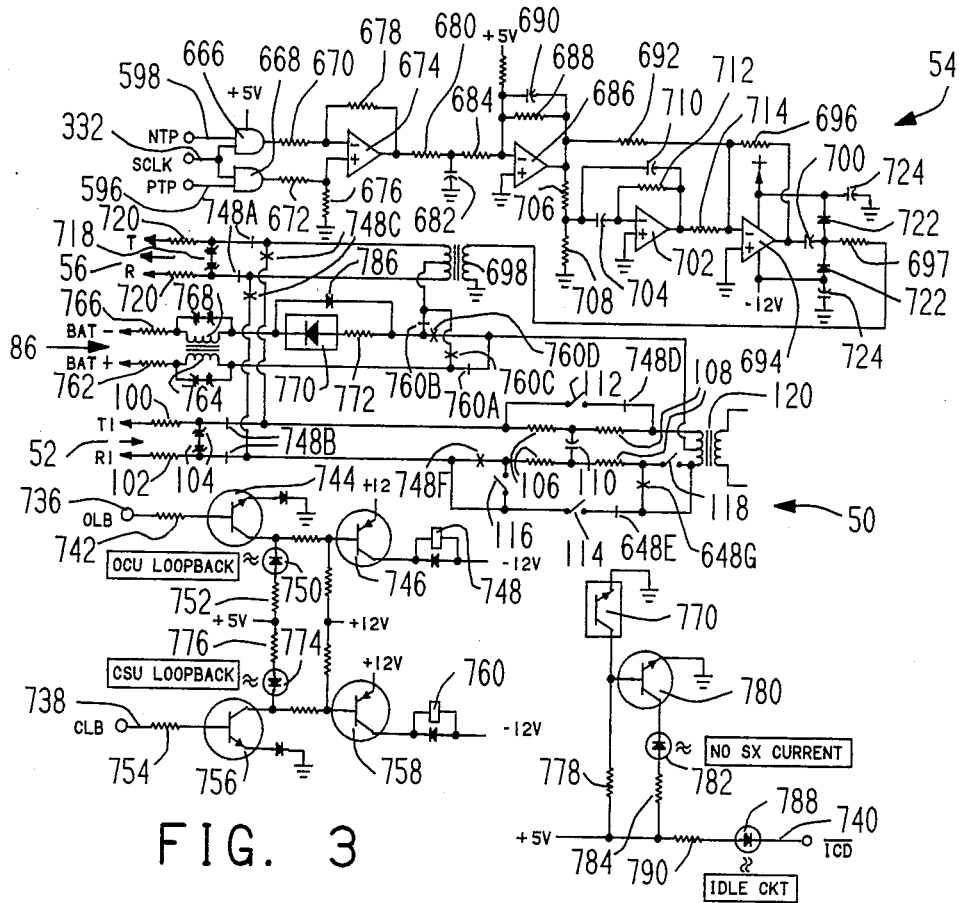
FIG. 3 is a circuit diagram of customer input and output circuits and a simplex current control circuit in the unit of FIG. 1.

In the input circuit 50, as illustrated in FIG. 3, lightning protection for the receiver circuit is provided by current limiting resistances 100 and 102 in series with the lines 52 and by break-down diodes 104 connected across the input lines. A lightning surge that threatens a line receiver is first reduced to 600 volts by the breakdown of a carbon block (not shown), and is further reduced to 18 volts by break-down of the diodes 104. The circuit 50 also includes a fixed line build out pad formed by resistance pairs 106 and 108 in series with each of the input lines and a capacitance 110 coupled across the lines for approximating the loss characteristics of a medium length line; the automatic line build out circuit (ALBO) provided in the receiver does not have sufficient dynamic range for building out the entire range of cable lengths that can be encountered in providing digital service to a customer. Consequently, the fixed line buildout pad can be inserted into the input circuit by opening screw switches 112 and 114 and closing screw switches 116 and 118 to provide signal attenuation approximating the loss characteristics of a medium length line.

Figure 5:
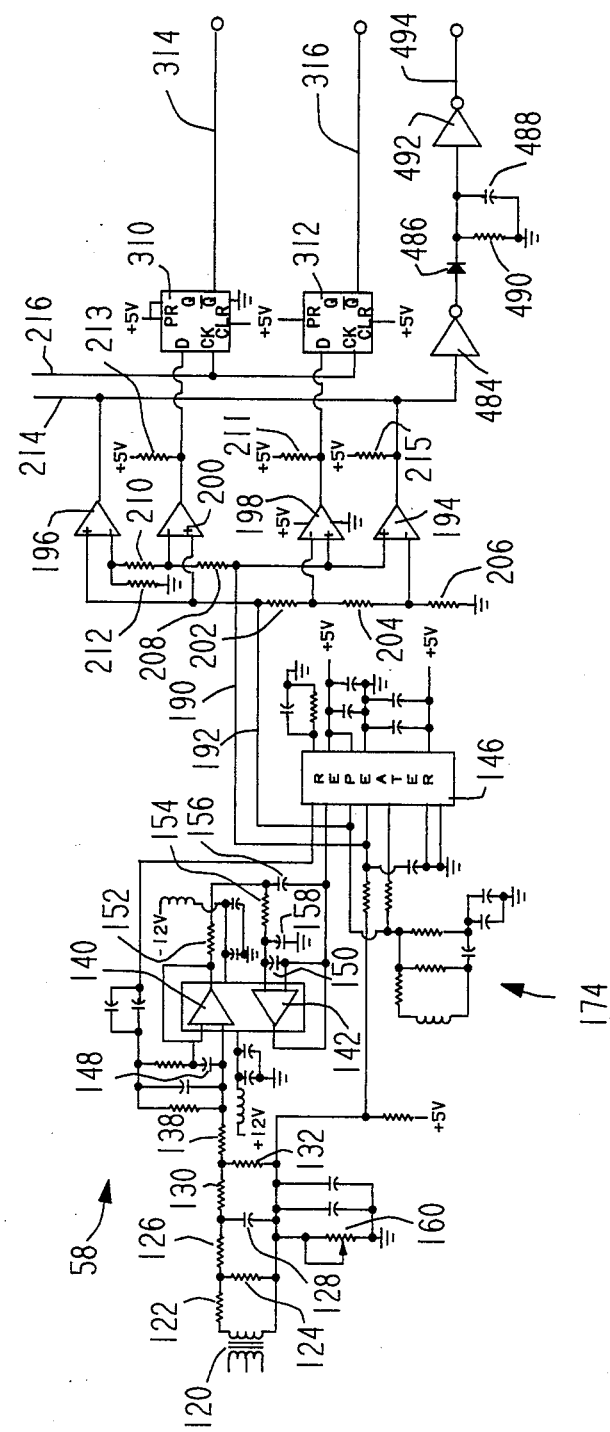
FIG. 5 is a circuit diagram of pulse reconstructing and separating circuit of the unit of FIG. 1.
Figure 6:
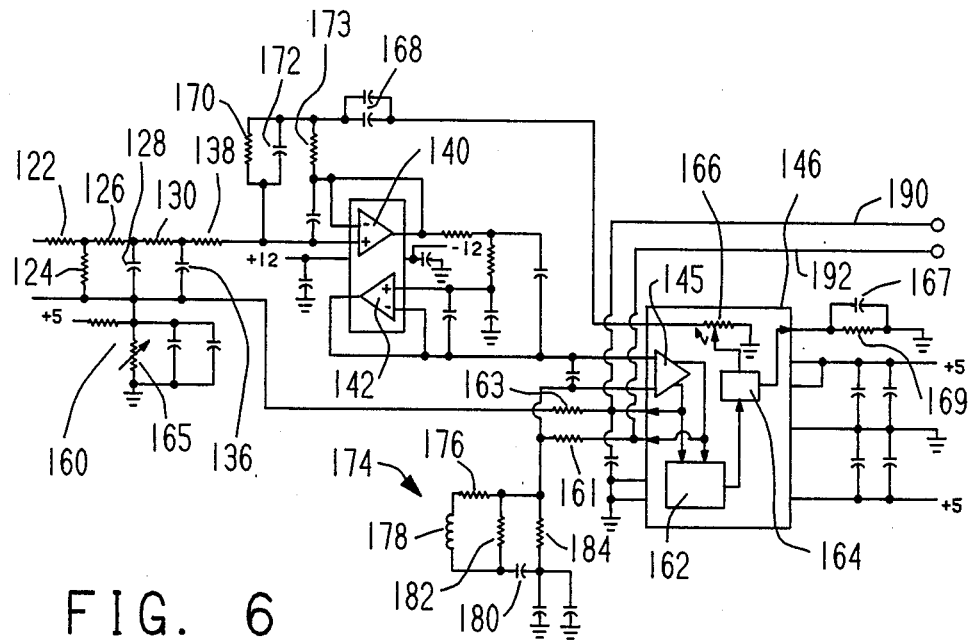
FIG. 6 is a diagram showing functional units in automatic line buildout and equalizing portions of the circuit of FIG. 5.

A transformer 120 couples the input circuit to the pulse reconstruct and separation circuit 58 illustrated in FIG. 5. The transformer 120 isolates the line receiver from DC potentials and spurious common mode signals which can be coupled onto the input transmission lines 52. The input transformer is a 1:2 step up transformer with an approximate frequency response from 100 hz through 100 khz. Series resistance 122 and shunt resistance 124 on the secondary side of the transformer 120 provide the characteristic load impedance generally required in transmission line specifications; the shunt impedance of the line receivers in the circuitry 58 is so large that it has substantially no affect on the transmission line terminating resistance. A resistance 126 and capacitance 128 provide low pass filtering to eliminate high frequency components from the input signals. For a customer rate of 56 kb/s, additional flat attenuation of the input signal is provided by a divider formed from resistances 130 and 132. For subrate customer transmission of 9.6, 4.8 and 2.4 kb/s this attenuation is not needed, but, as shown in FIG. 6 for subrates of 4.6 and 2.4 kb/s additional low pass filtering is provided by replacing resistance 132 with capacitance 136 to eliminate higher frequency components in the input signal which could interfere with these lower subrate signals.

An isolation resistance 138 connects the output of the low pass filter to the input of one of a pair of buffer amplifiers 140 and 142 connected in series to the input of a preamplifier 145 in a PCM repeater 146. Capacitances 148 and 150 coupled across the inputs of the amplifiers 140 and 142 together with resistances 152 and 154 and shunt capacitances 156 and 158 between the amplifiers 140 and 142 provide additional low pass filtering and shaping to roll-off high frequency noise from the transmission line to thus provide increased signal-to-noise ratio for the receiver circuitry.

A biasing circuit 160 provides bias for the preamplifier 145 of the repeater 146. Feedback resistance 161 is used to return the inverting output to the non-inverting input of amplifier 145 while the non-inverting input is connected by the resistance 163 to the fixed bias circuit 160. The fixed biasing potential is adjusted by the potentiometer 165 until the differential output offset, measured between the non-inverting and inverting outputs of the amplifier 145, is zero. The fixed DC bias is applied to the secondary of the input transformer 120 and is coupled through the input filter, buffer amplifiers 140 and 142, and shaping filter to the inverting input of the amplifier 145.

The PCM repeater 146 is an integrated circuit unit designed for utilization in pulse code modulation transmission lines operating at relatively high frequencies of 1.544 megahertz. These commercially available integrated circuit repeaters include, besides the amplifier 145, a peak detecting circuit 162 which produces a output voltage applied to an ALBO control circuit 164 operating an ALBO diode or varistor such as a field effect transistor 166 which is normally connected in series with a parallel arrangement of a fixed resistance and capacitance across the inputs of the amplifier 145 for providing a variable shunt impedance to provide automatic line build-out functions for the circuit. An ALBO filter consisting of capacitance 167 and resistance 169 provides for filtering of the peak output to produce a DC control voltage for the ALBO diode 166 proportional to the magnitude by which the positive and negative pulse output of the peak detector 162 exceeds the detector threshold, for example 1.6 volts. The ALBO diode 166 of the repeater 146 is connected by coupling capacitances 168 in series with an impedance network formed by parallel resistance 170 and capacitance 172 designed to provide variable loss characteristics to the buffer amplifier input so that the total loss characteristics of the actual transmission line and input circuitry is generally equal to the loss characteristics of a transmission line having maximum length. Thus, the circuit can adapt for large variations in transmission loss characteristics due to varying length lines without having to be recalibrated or adjusted for each individual transmission line.

A feedback resistance 173 is connected from the output of the buffer amplifyier 140 through the network of resistance 170 and capacitance 172 to the non-inverting input of the amplifier 140. This feedback resistance 173 does not change the general characteristic of the ALBO network, but it does provide an additional degree of freedom in the realization of the circuit constants that allows better tracking of the transmission line characteristic by the ALBO.

Figure 8:
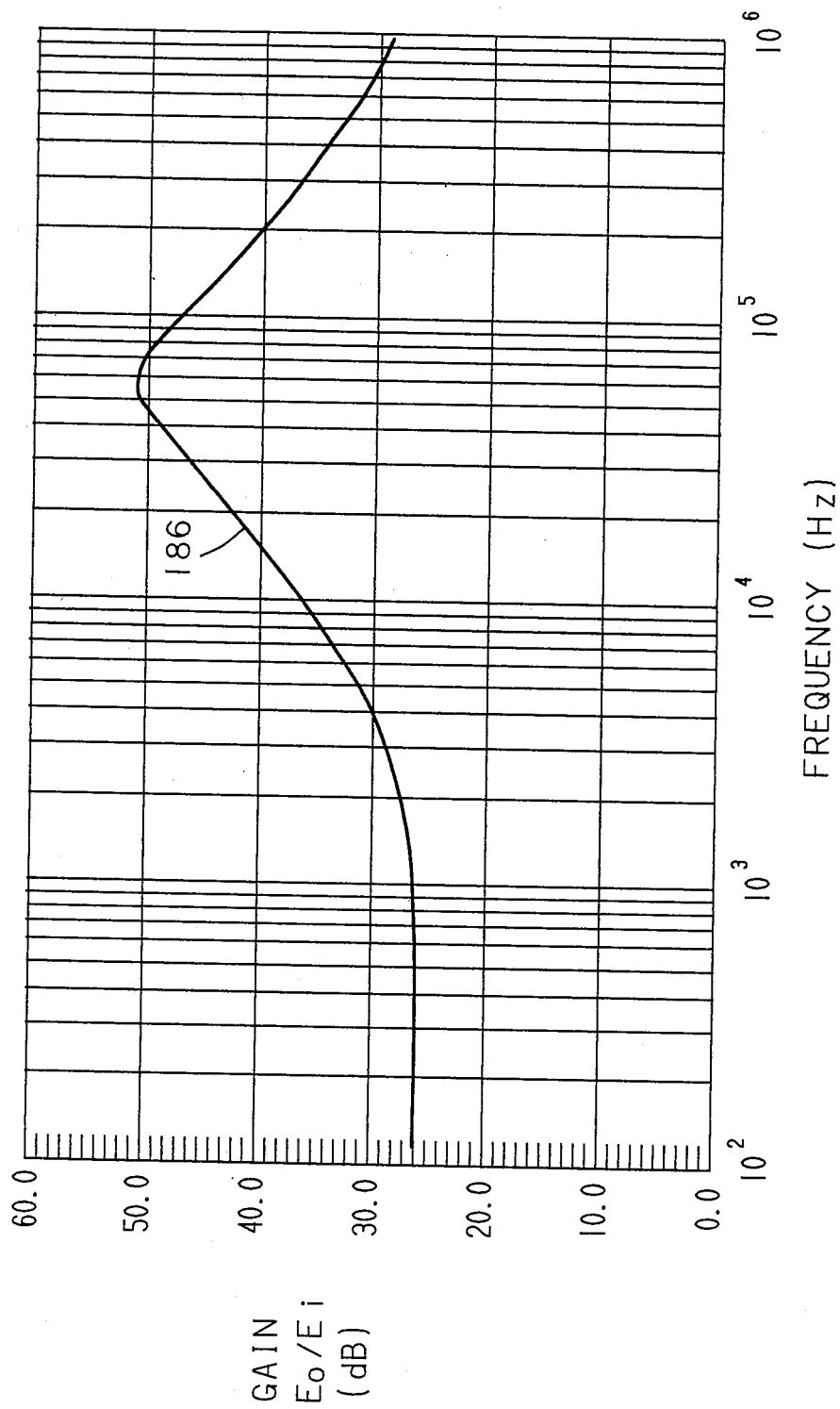
FIG. 8 is a graph of the frequency spectrum of gain for the equalizing portion of the circuit of FIGS. 5–7.

The output of the amplifier 145 is coupled across an equalizing circuit indicated generally at 174 which includes series resistance 176, inductance 178 and capacitance 180, together with shunt resistances 182 and 184, all of which have values selected to produce a desired frequency dependent gain characteristic for the amplifier 145, for example, as shown by the graph in FIG. 8 for the customer rate of 56 kb/s.

Figure 7:
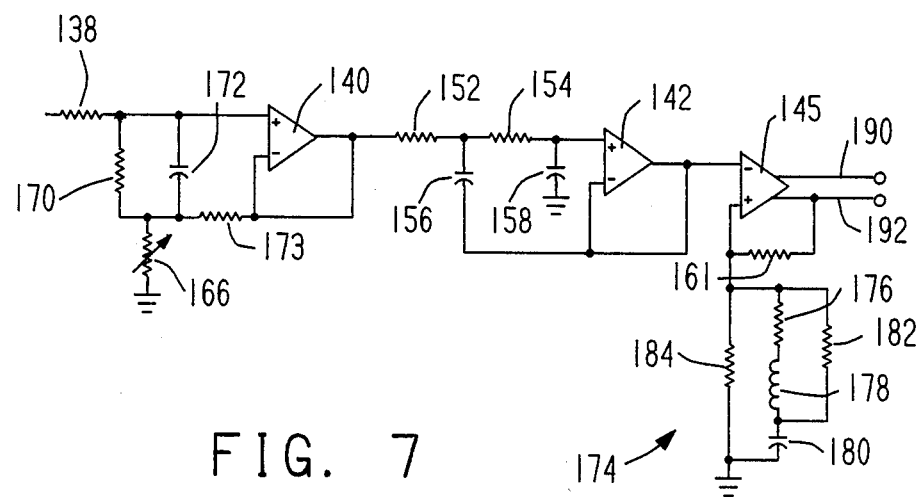
FIG. 7 is a simplified functional diagram of the automatic line buildout and equalizing circuitry of FIGS. 5 and 6.

The operation of the automatic line buildout and equalizing circuit can be understood by referring to FIG. 7 wherein the circuitry is illustrated in functional form. FIG. 8 shows a typical transfer or gain function 186 of the equalizer circuitry for a maximum length line at 56 KHz. The incoming signal passes through the buffer amplifiers 140 and 142 to the amplifier 145 which is coupled to the equalizer circuit 174 to restore frequency equalization of the incoming signal as required for a maximum length transmission line. When the actual transmission line is a maximum length, the peak output of the amplifier 145 will be about 1.6 volts which produces a 0 output voltage from the peak detector 162 to maintain the varistor 166 in a high resistance mode so that series resistance presented by resistance 138, as well as the preceding resistances introduces substantially no signal loss due to the high input impedance of the amplifier 140. The high resistance of the varistor 166 results in substantially no shunt impedance being applied to the input signal by the resistance 170 and capacitance 172. When the transmission line is less than a maximum length, the output of the amplifier 145 will be greater than 1.6 volts which results in the peak detector circuit 162 generating an output voltage to reduce the resistance value of the varistor 166. The lesser resistance value of the varistor 166 reduces the shunt impedance on that input of amplifier 140 producing increased loss through resistance 138. This increased loss is partly flat, i.e., frequency independent, corresponding to transmission line resistance losses, and partly frequency dependent corresponding to transmission line shunt capacitance losses. The value of the circuit components are selected as the losses inserted for transmission lines less than maximum length produce signal attenuation closely approximating that produced by a maximum length transmission line.

Considering the ALBO network as a series impedance and a shunt impedance the transfer function of this network consists of an adjustable zero, adjustable flat loss, and a fixed pole. The adjustable zero is used to cancel the effective pole of the less than maximum length cable pair. The flat loss of the ALBO and its fixed pole then combine with the flat loss of the less than maximum length cable pair such that the combination approximates the loss characteristics of a maximum length loop. The flat loss and zero location are functions of the variable resistor 166 which is physically realized with the varistor diode internal to repeater 146. Resistor 166 is inversely controlled by the peak detector circuitry at the output of the equalizer 145. The peak of the equalized signal closely tracks the cable loss at one-half the data rate since the bipolar cable signal has its largest frequency component at one-half the data rate. Thus, as the associated cable pair becomes longer, the peak signal becomes less, resistor 166 increases, ALBO loss decreases and the zero frequency location tends toward the fixed pole frequency. Therefore, on a maximum-length cable pair, the ALBO is essentially transparent, adding neither gain nor loss at any frequency.

Figure 12:
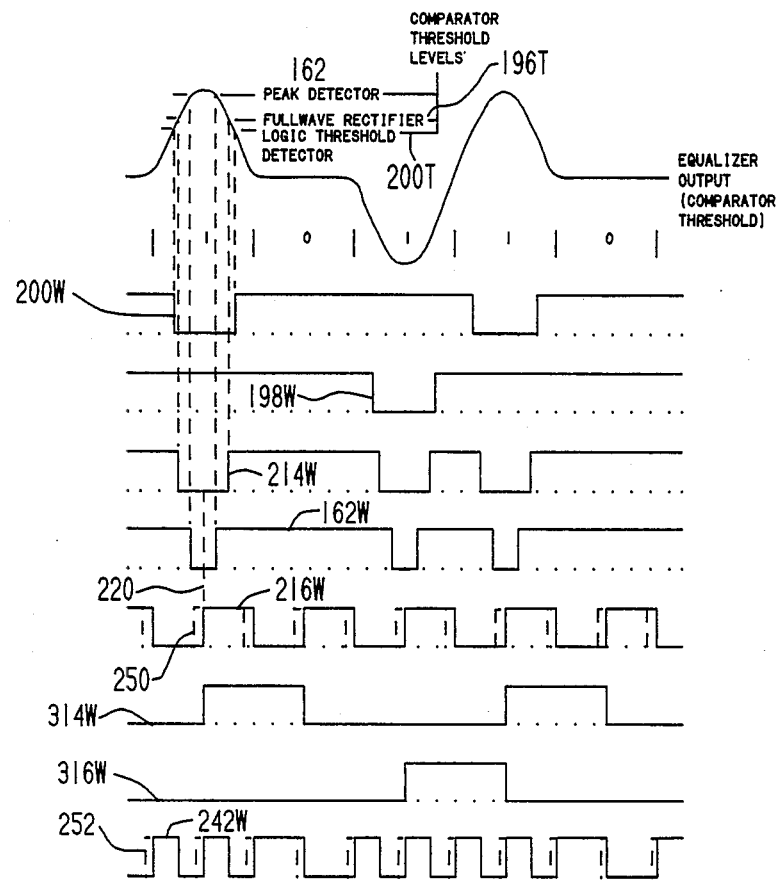
FIG. 12 is a graph of pulse wave forms generated in the bipolar slicing and clock recovery circuits of FIGS. 5 and 9.

The non-inverting and inverting outputs of the amplifier 145 on respective lines 190 and 192, FIG. 5, are connected to the non-inverting inputs of respective comparators 194 and 196 forming a full wave rectifier, and are connected to non-inverting inputs of respective comparators 198 and 200 which form respective positive and negative logic threshold detectors. Reference inputs for the comparators 194 and 198 are provided by a voltage divider formed by resistances 202, 204 and 206 connected between the inverting output 192 and ground, while reference voltages for the inverting inputs of the comparators 196 and 200 are provided by the voltage divider formed by resistances 208, 210 and 212 connected serially between the output line 190 and ground. The positive and negative thresholds of the respective comparators 194 and 196, as determined by the junction between resistances 204 and 206 and the junction between resistances 210 and 212, are selected to be about 70% of the peak voltage level, as shown in FIG. 12 for the threshold 196T of the positive pulse. The respective positive and negative thresholds of the comparators 198 and 200, as determined by the junction between resistances 202 and 204 and the junction between resistances 208 and 210, are selected to be about 50% of the peak voltage level, as shown for threshold 200T. The output waveforms 198W and 200W from comparators 198 and 200, biased positive through resistances 211 and 213, are binary pulse signals corresponding to the respective positive and negative pulses in the incoming bipolar signal. The output waveform 214W from the full wave rectifier, and waveform 162W from the peak detector 162 are also shown in FIG. 12.

Figures 9, 10, 11:
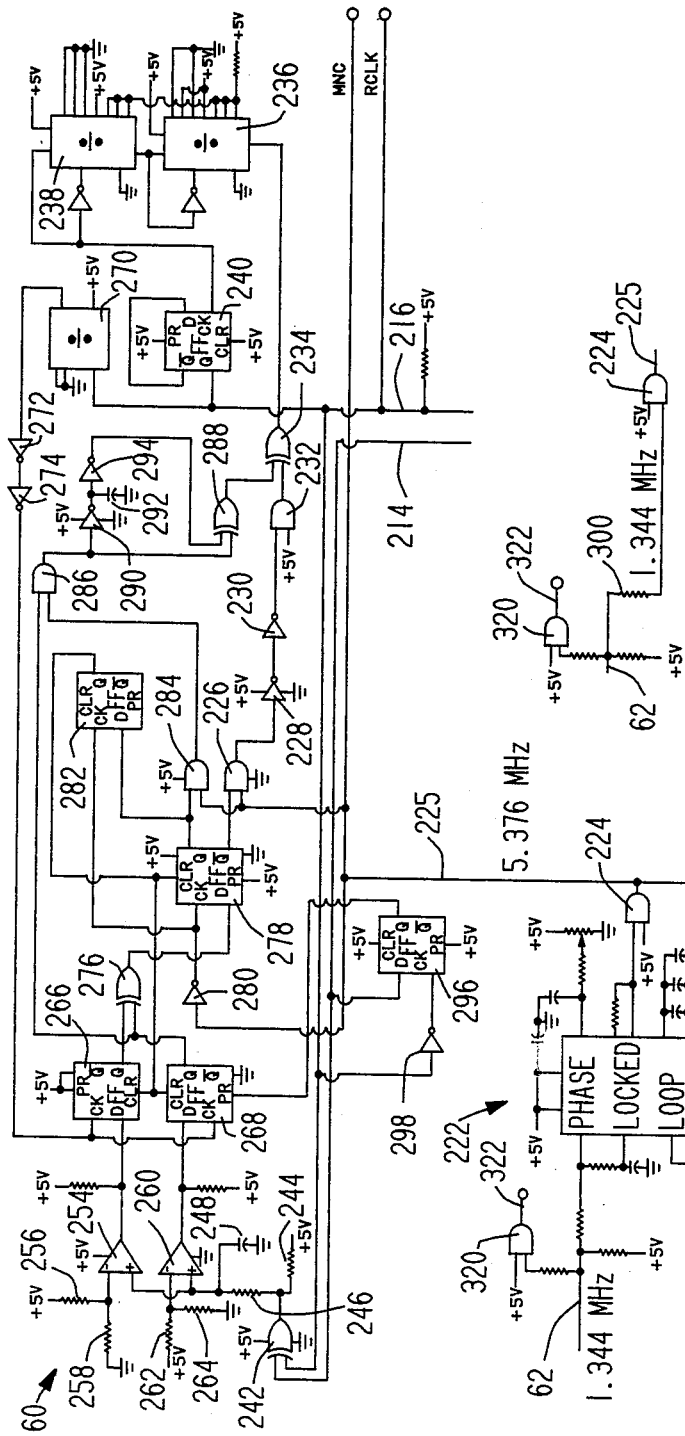
FIG. 9 is a diagram of a clock pulse recovery circuit in the unit of FIG. 1, particularly for use at 56 kb/s.
FIG. 10 is a diagram of a clock reference source input circuit for use in the clock recovery circuit of FIG. 9 at 9.6 kb/s.
FIG. 11 is a diagram of a modified reference source input circuit for use in the clock recovery circuit of FIG. 9 at 4.8 kb/s.

The output 214 of the full wave rectifier comparators 194 and 196, biased positive through resistance 215, is utilized to produce a recovered customer clock pulse on line 216. As shown in FIG. 9, a system reference source on line 218 at a frequency 1.344 MHz is multiplied or divided to obtain the corresponding local customer rates with the phase of the regenerated clock 216 being controlled so that the positive edge of the regenerated clock 216W occurs in the center of each customer pulse in signal 214W as shown by the dashed line 220 in FIG. 12. For the 56 kb/s OCU as shown in FIG. 9, the 1.344 MHz network reference is multiplied by a phase lock loop circuit 222 to produce a 5.376 MHz signal from the output of buffer gate 224 which is passed through normally open AND gate 226, inverter amplifiers 228 and 230, buffer gate 232, exclusive OR gate 234 to the input of a divider consisting of counters 236 and 238 and a flip-flop 240 which divide the 5.376 MHz signal by 96 to obtain the 56 kb/s recovered clock signal 216. The recovered clock signal 216 and the full wave rectified pulse output 214 are applied to respective inputs of an exclusive OR gate 242 which has its output biased positive by a resistance 244 and connected to an integrater consisting of resistance 246 and capacitance 248. When the positive edges of the recovered clock signal 216W correspond to the center 220 of the incoming pulses, as shown in FIG. 12, the output 242W of the exclusive OR gate 242 has a duty cycle of 50% to thus produce a voltage across the capacitance 242 equal to one half of the bias voltage. When the positive edges of the pulses 216W lead the center 220, as shown by the dashed line 250 in FIG. 12, then the duty cycle of the output of the exclusive OR gate 242 increases as shown by the dashed line 252 to thus increase the voltage across the capacitance 248; if the positive edge of pulses 216 trail the center 220, the duty cycle of gate 242 decreases to produce a corresponding lower voltage across the capacitance 248.

The voltage across the capacitance 248 is connected to a non-inverting input of a comparator 254 which has its inverting input connected to a voltage divider formed from resistances 256 and 258 across the supply voltage, and to an inverting input of a comparator 260 which has its non-inverting input connected to a voltage divider formed by resistances 262 and 264 across the voltage source. The resistances 256 and 258 are selected to provide a reference source so that the comparator 254 produces a positive output when the recovered clock pulses 216 lead the center of the detected incoming pulses by more than about 8°, while the values of the resistances 262 and 264 are selected so that the comparator 260 produces a positive output only when the leading edge of the pulses 216 trail the centers of the incoming pulses by more than about 8°. The outputs of the comparators 254, 260 are connected to data inputs of respective flip-flops 266 and 268 which receive a clock signal from a counter 270 through inverters 272 and 274. The counter 270 divides the clock signal 216 by 64 so that a normal phase adjustment in the recovered clock pulses can only occur once during every 64 pulses on line 216; this prevents clock instability or hunting. The non-inverted outputs of the flip-flops 266 and 268 are applied to respective inputs of an exclusive OR gate 276 which has its output connected to the data input of a flip-flop 278 which is clocked through inverter 280 from the high frequency reference clock signal from buffer gate 244. A flip-flop 282 has its data input connected to the non-inverted output of the flip-flop 278 so that upon the ensuing reference pulse from inverter 280, the flip-flops 266, 268 and 278 are reset by the non-inverted output of the flip-flop 282. The inverted output of the flip-flop 278 is connected to one input of the AND gate 226 so that for one cycle of the reference pulse from buffer gate 224, the gate 226 is disabled and the count in the counters 236 and 238 is delayed by one reference pulse to thus retard the recovered clock pulses 216 when the positive edge of the pulses 216W lead the center 220 of the incoming pulses 214W.

Figure 13:
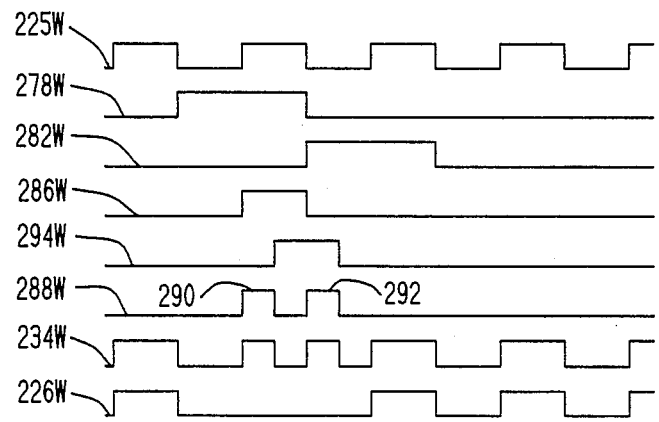
FIG. 13 is a graph of various high frequency pulse wave forms of the clock reference source and clock recovery circuit of FIG. 9.

The non-inverted output of the flip-flop 278 is connected to one input of an AND gate 284 which has its input connected to the output of the reference clock buffer gate 224 to pass one cycle of the reference clock signal 225W, FIG. 13, to one input of an AND gate 286 which has its other input controlled by the non-inverted output of flip-flop 268 so that when the positive edge of the pulses 216W trail the center of the incoming pulses, one reference clock pulse 225W is passed through gate 286. The waveforms 278W and 286W from the flip-flop 278, flip-flop 282 (which resets flip-flop 278), and gate 286 are shown in FIG. 13. The output of AND gate 286 is connected to one input of exclusive OR gate 288 and to an inverter 290 which has its output coupled across a capacitance 292 and to the input of an inverter 294 having its output connected to the other input of the exclusive OR gate 288. The capacitance 292 delays the inverter 294 as shown by the wave form 294W in FIG. 13 to result in the exclusive OR gate 288 producing two pulses 290 and 292 as a result of the reference clock pulse passed by the AND gate 286. These two pulses 290 and 292 are applied to the second input of exclusive OR gate 234 which combines the waveform 288W with the waveform 226W to produce waveform 234W wherein the two pulses 290 and 292 replace the reference clock pulse blocked by gate 226 to thus advance the counter 236 two steps and to advance the phase of the recovered clock pulse signal 216W relative to the incoming pulses 214W.

The clock recovery circuit of FIG. 9, also includes a clock phase restoring circuit having a flip-flop 296 with its data input connected to the full rectified incoming pulse line 214 and its clock input from the recovered clock line 216 through inverter 298. The flip-flop 296 is operated when the negative or trailing edge of the recovered clock pulses 216W occur during the negative recitified pulses 214W. The non-inverting output of flip-flop 296 is applied to the preset input of flip-flop 268 to hold the flip-flop 268 operated while the counter 236 is rapidly advanced by double pulses generated through exclusive OR gate 288 until the negative edges of the pulses 216W no longer occur during the negative pulses 214W. This prevents the clock recovery pulses 216W from being falsely synchronized 180° out of phase or with the positive portion of the rectified signal 214W.

Figure 2:
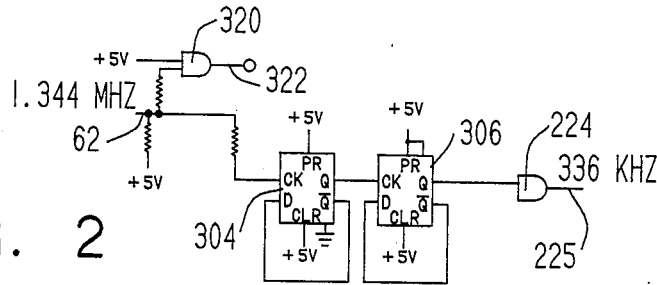
FIG. 2 is a diagram of a clock reference source input circuit for use in a clock recovery circuit (FIG. 9) in the office channel unit of FIG. 1 at a customer rate of 2.4 kb/s.

Modifications replacing the phase locked loop 222 for providing subrate office channel units are illustrated in FIGS. 10, 11 and 2. For these subrate office channel units, the preset inputs of 236 and 238 are modified to divide by 70 so that the total division with flip-flop 240 is equal to 140. For the 9.6 kb/s modification of FIG. 10, the incoming 1.344 MHz reference clock on line 62 is fed by resistance 300 directly to the buffer gate 224. In the 4.8 kb/s modification of FIG. 11, the reference signal on line 62 is divided by 2 by flip-flop 302 before passing to buffer gate 224. In the 2.4 kb/s modification of FIG. 2, the reference clock on input 218 is divided by 4 by flip-flops 304 and 306.

Referring back to FIG. 5, the positive edges of the recovered clock signal on line 216 clocks flip-flops 310 and 312 which have their respective data inputs connected to the outputs of comparators 198 and 200 so that positive going pulses appearing in the bipolar input signal appear on the inverting output 314 (see waveform 314W, FIG. 12) of the flip-flop 310 and the negative pulses in the incoming bipolar signal appear on the inverting output 316 (see waveform 316W, FIG. 12) of the flip-flop 312.

Figure 14:
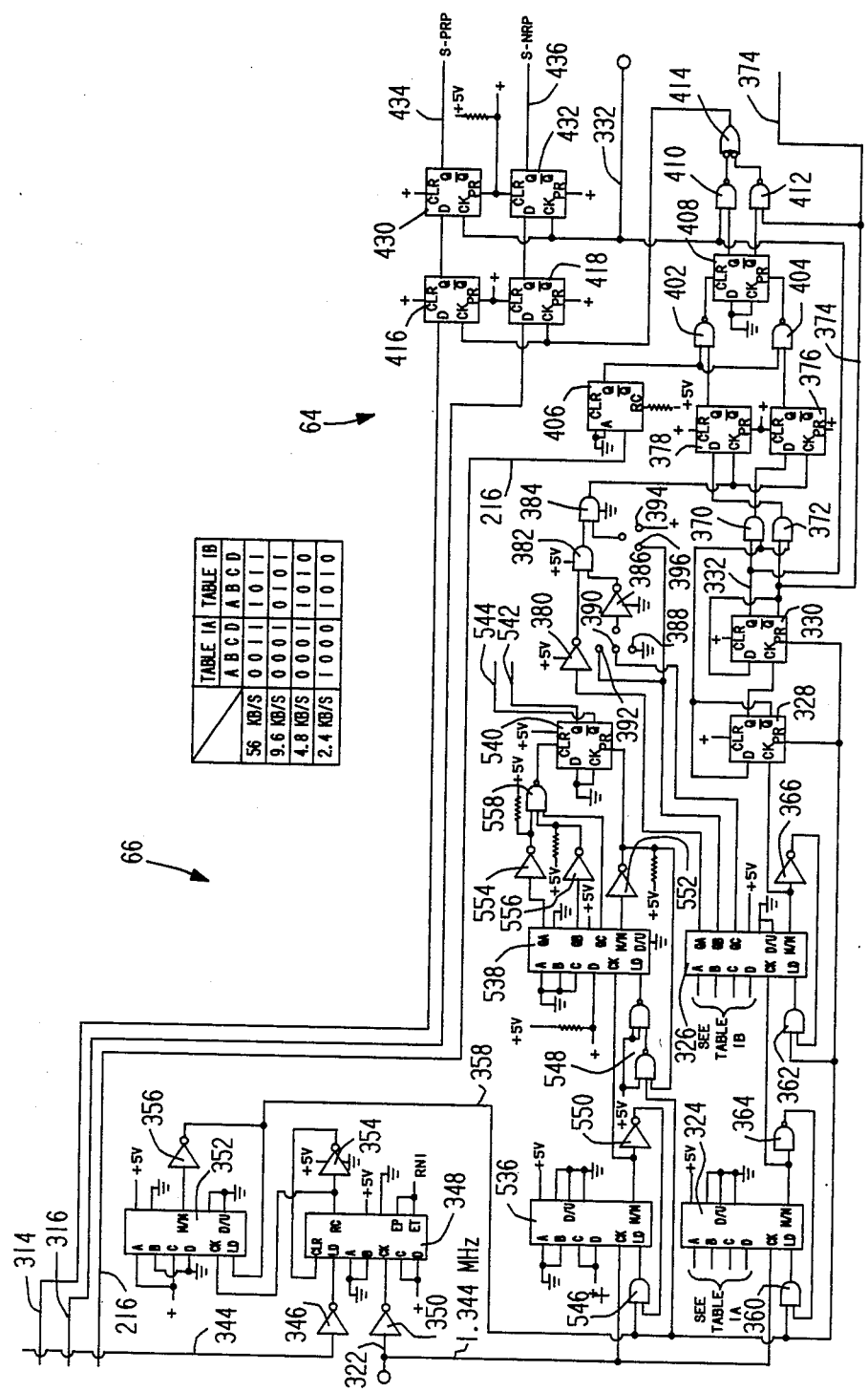
FIG. 14 is a diagram of circuits for generating synchronized network and local pulse rate clocks and for rephasing customer serial input pulses in the unit of FIG. 1.
Figure 15:
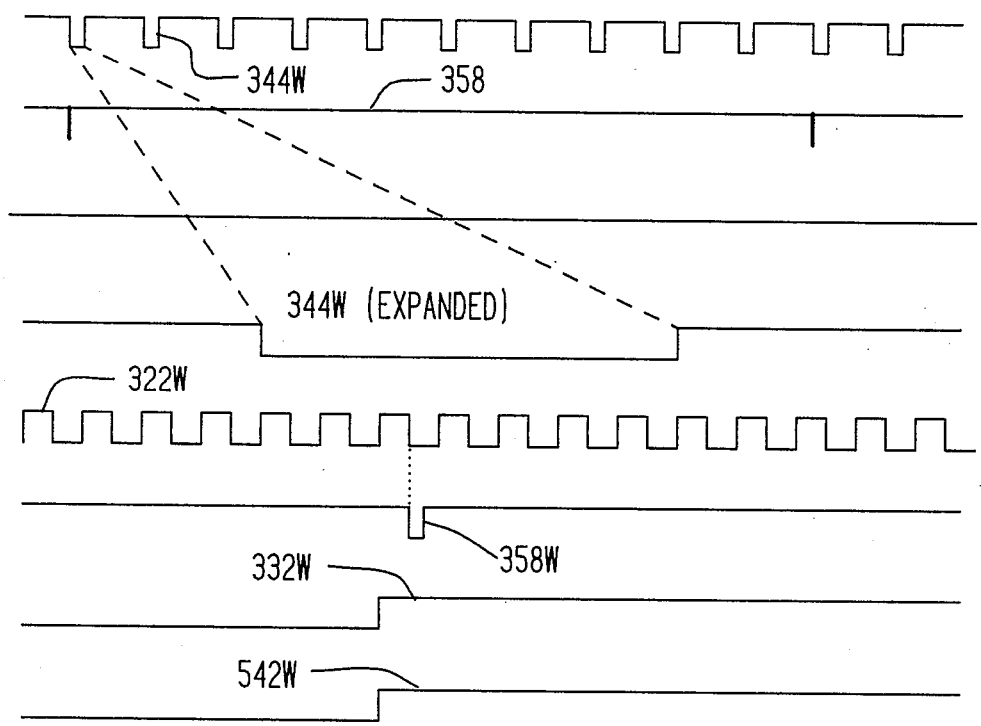
FIG. 15 is a graph of synchronizing pulse wave forms used in the network clock and customer rate clock generators of FIG. 14 for synchronization with the network sync pulse.
Figure 17:
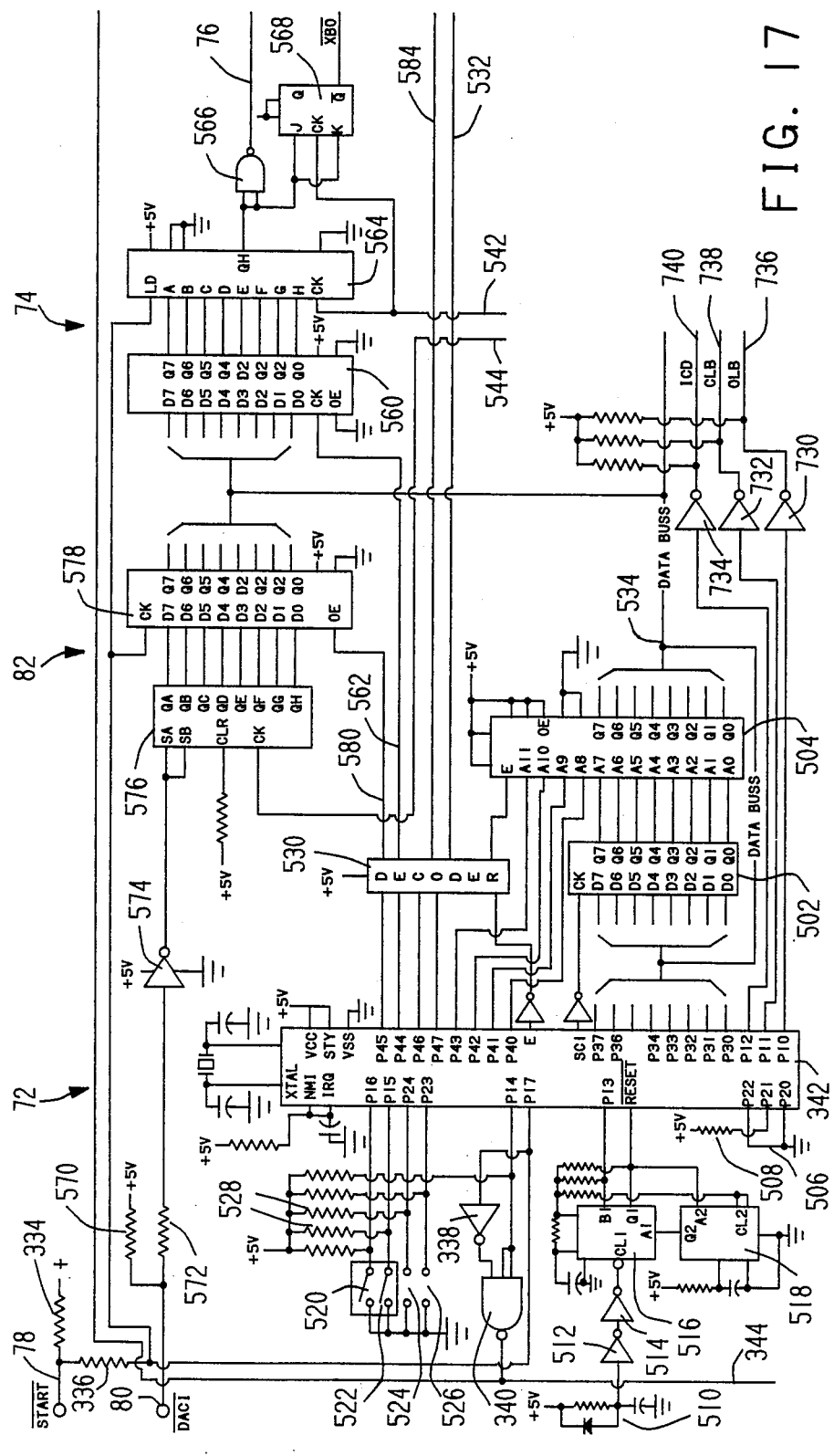
FIG. 17 is a diagram of computer circuitry and network input and output circuitry in the unit of FIG. 1.

The phase of the incoming bipolar customer signal varies with varying customer line lengths, and thus the separated positive and negative pulses on lines 314 and 316 are rephased by the pulse rephase circuitry 64 in FIG. 14 with a synchronized clock from clock circuitry 66. The 1.344 MHz network system clock on line 62 is applied by buffer amplifier 320, FIG. 9, to line 322 which, as shown in FIG. 14, is applied to a counting arrangement consisting of serially connected counter 324, counter 326, and flip-flops 328 and 330 to generate a customer rate clock signal which has every seventh pulse (56 kb/s) or every sixth pulse (2.4, 4.8 and 9.6 kb/s) synchronized with the 8K sync signal of the telephone network system. As shown in FIG. 17, the 8K sync line 78, biased positive by resistance 344 is connected by resistance 336 to one input of an inverter 338 which has its output connected to NAND gate 340 controlled by an output of a microprocessor 342 in the computer 72. At 56 kb/s the gate 340 is maintained enabled to pass every sync pulse to line 344; at 9.6 kb/s the NAND gate 340 is enabled to pass every fifth sync pulse; at 4.8 kb/s the NAND gate 340 is enabled to pass every tenth sync pulse; and at 2.4 kb/s the NAND gate 340 is enabled to pass every 20th sync pulse. As shown in FIG. 14 the sync pulse line 344 is connected by an inverter 346 to the load input of a counter 348 to enable the counter during the sync pulse and to preset the counter to the count of 12 at the trailing edge of the sync pulse. The 1.344 mhz clock on line 322 is inverted by inverter 350 and applied to the clock input of counter 348. The full count indicating output of the counter 348 is connected to the clock input of a counter 352 to advance the count in counter 352 one count after 2½ cycles of the 1.344 clock on line 322 during the sync pulse on line 344. Additionally, the full count output of counter 348 is applied by inverter 354 to the clear input of counter 348 to clear the count. The count in counter 352 is initially set at 5 so that upon receipt of 10 sync pulses on line 344, the max output of counter 352 operates inverter 356 to apply a clear signal on line 358 to AND gate 360 connected to the load input of counter 324, to AND gate 362 connected to the load gate of counter 326 and to preset inputs of flip-flops 328 and 330 to synchronize the voltage divider formed by counters 324, 326 and flip-flops 328 and 330. The preset inputs of the counters 324 and 326 are selected in accordance with Table 1A and 1B for the corresponding 56, 9.6, 4.8 and 2.4 kb/s operation. Under normal operations the max outputs of counters 324 are applied by respective inverters 364 and 366 to second inputs of AND gates 360 and 362 to provide continuous operation. FIG. 15 shows the relative timing of the 8K sync pulses 344W on line 344, high frequency reference clock signal 322W on the line 322, and clear pulse 358W on line 358 as well as the beginning of the customer clock pulse 332W on line 332.

Figure 16:
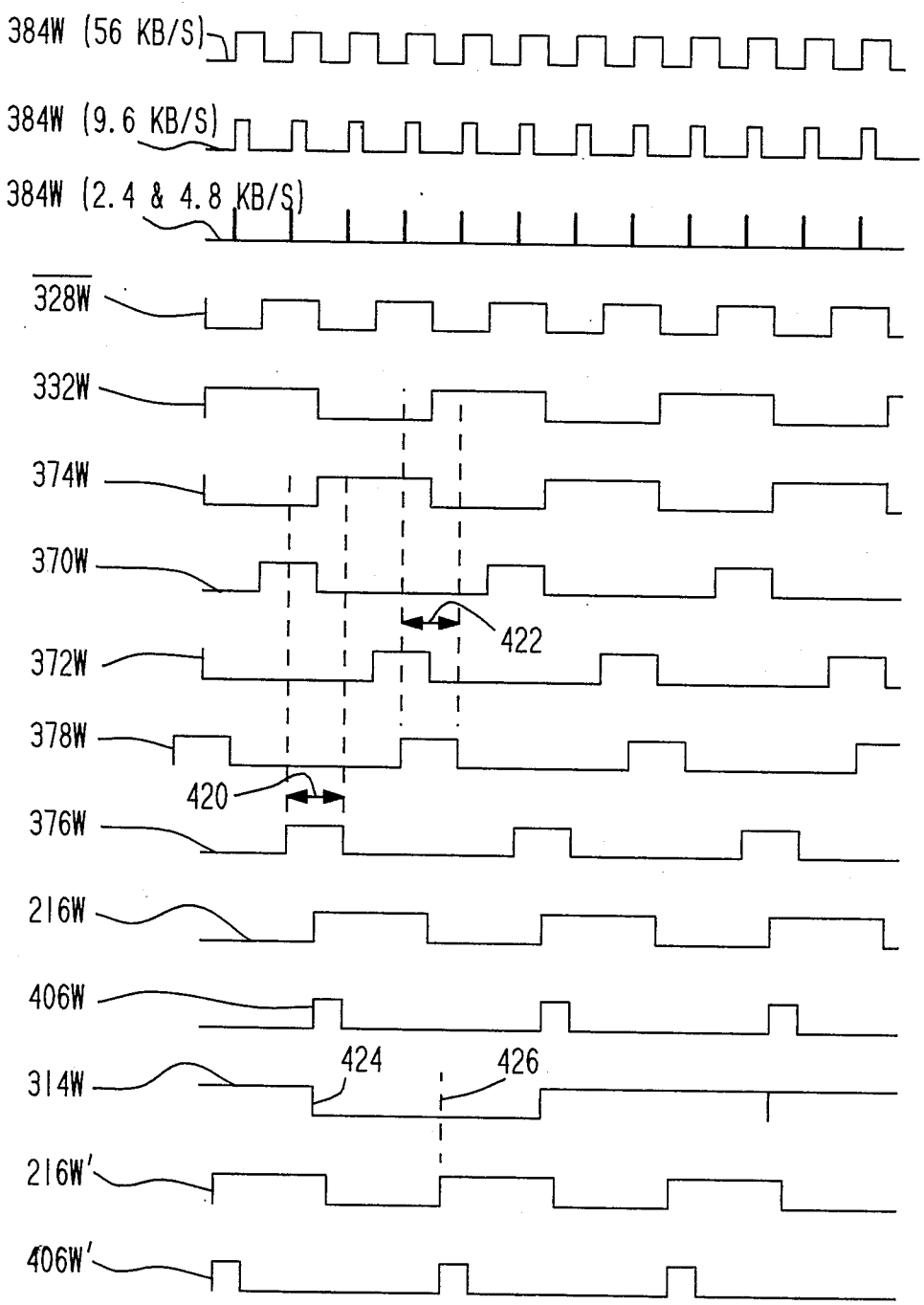
FIG. 16 is a graph of pulse wave forms generated in synchronized customer rate clock circuitry of FIG. 14 for retiming the customer data pulses with respect to the network sync pulse.

The inverted output of the flip-flop 328 is applied to first inputs of AND gates 370 and 372 while the customer rate clock signal on line 332 and its inverse on line 374 are applied to the second inputs of the respective AND gates 370 and 372. The outputs of AND gates 370 and 372 are connected to data inputs of flip-flops 376 and 378, respectively. The least significant bit output of counter 326 is connected by inverter 380 to one input of a AND gate 382 which has its output connected to one input of a NAND gate 384 which drives the clock input of the flip-flops 376 and 378. The second input of AND gate 382 is operated by an inverter 386 which has its input jumper to one of the terminals 388, 390 or 392. At 56 kb/s, the input of inverter 386 is connected to terminal 388 to ground to hold gate 382 enabled. At 9.6 kb/s, the input of inverter 386 is connected to terminal 392 which is connected to the second least significant output of the counter 326. For 2.4 and 4.8 kb/s, the input of inverter 386 is connected to terminal 390 which is connected to the third least significant bit output of counter 326. The second input of AND gate 384 is jumper to terminal 394 to enable gate 384 at 9.6 and 56 kb/s, or to terminal 396 to the second least significant bit output of counter 326 at 2.4 and 4.8 kb/s. The wave forms 384W produced on the output of gate 384 at the respective rates is shown in FIG. 16. The inverted output waveform 328W from flip-flop 328 is gated with the respective waveforms 332W and 374W (synchronized customer rate clock and inverted synchronized customer rate clock) from the non-inverted and inverted outputs of flip-flop 330 to produce respective waveforms 370W and 372W from gates 370 and 372. Clocking of the signals 370W and 372W with the clock 384W in flip-flops 376 and 378 produces waveforms 376W and 378W.

The outputs of flip-flops 376 and 378 are connected to first inputs of respective NAND gates 402 and 404 which have their second inputs connected to the output of a one shot or monostable multivibrator 406 operated by the leading edge of the recovered clock signal on line 216. The outputs of the NAND gates 402 and 404 are connected to the respective clear and preset inputs of a flip-flop 408 which has its non-inverted output connected to one input of NAND gate 410 and has its inverted output connected to one input of NAND gate 412. Second inputs of the gates 410 and 412 are connected to the respective clock and inverted clock lines 332 and 374. The outputs of gates 410 and 412 are connected to a NAND gate 414 which drives the clock inputs of flip-flops 416 and 418 to read the binary rail signals on the respective lines 314 and 316.

As shown in FIG. 16, the outputs 376W and 378W of flip-flops 376 and 378 produce respective windows as shown by the double arrowed lines 420 and 422. The window 422 surrounds the leading edge of the clock signal 332W while the window 420 surrounds the leading edge of the inverted clock signals 374. The reading of the rail signals on lines 314 and 316 by the flip-flops 416 and 418 cannot occur during intervals where the binary rail signals may change state or at the boundary between bits represented in the rail signals as shown for the signal 314W at 424. As shown in FIG. 16 this edge 424 can correspond to the leading edge of the inverted signal 374. Thus, the coincidence of the pulse 406W from one shot 406 with the window 420 results in flip-flop 408 being preset by gate 404. The flip-flop 408 enables gate 410 to utilize the non-inverted clock signal 332 to clock the flip-flops 416 and 418 at time illustrated by the dashed line 426 during which the rail signals 314 and 316 can be safely read. If the rail signals 314 had a relative timing so that they changed state at approximately the dashed line 426, then the recovered clock signal would resemble the wave form 216W' and the pulse output 406W' of one shot 406 coincides with window 422 to operate gate 402 and clear the flip-flop 408 causing gate 412 to be enabled to pass the inverted clock signal 374W for clocking the flip-flops 416 and 418 to avoid reading the rail signals at time 426.

The outputs of flip-flops 416 and 418 are connected to data inputs of respective flip-flops 430 and 432 which are clocked by the clock signal 332. The outputs of flip-flops 430 and 432 on respective lines 434 and 436 are thus rephased to the customer rate clock generator in circuit 66 which has every 6th (2.4, 4.8 and 4.8 kb/s) or every 7th (56 kb/s) pulse synchronized with the telephone network 8K sync signal on line 344.

Figure 18:
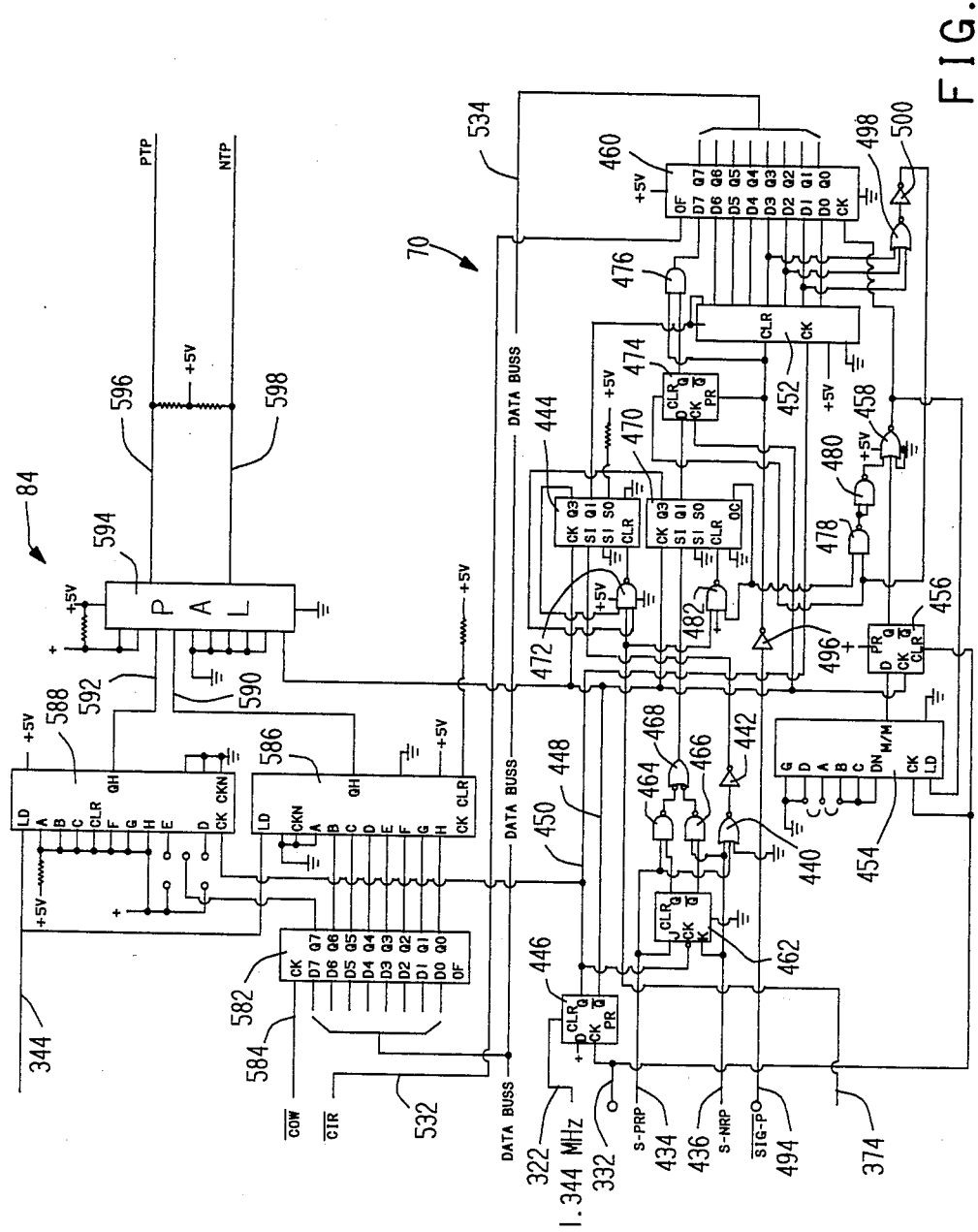
FIG. 18 is a diagram of parallel to bipolar, bipolar to parallel, and violation decoding and incoding circuitry in the unit of FIG. 1.

Referring to FIG. 18, the rephased rail signals 434 and 436 are applied to respective inputs of a NOR gate 440 to produce a single binary output corresponding to the sum of the signals 434 and 436 which is applied by inverter 442 to the serial input of a four bit shift register 444. The network customer rate clock signal 332 is applied to the clock input of a flip-flop 446 which is cleared by the 1.344 MHz reference clock 322 to produce respective negative and positive strobe or clock signals 448 and 450. The negative clock line 448 is connected to the clock input of the register 444 so that the serial customer data from inverter 442 is read upon the trailing edge of the pulses on line 448 into the register 444. The Q1 output of register 444, i.e., the output to which serial input data is shifted on the third clock pulse, is connected to the serial input of an eight bit shift register 452 which is clocked by the positive clock 450 so that upon the fourth clock pulse after the incoming data from inverter 442 is applied to the shifter register 444 the data bit is shifted into the register 452. The number of clock pulses 332 are counted by a counter 454 which has its preset input set to count seven when the OCU is operating at 56 kb/s or has its preset input set to count six when the OCU is operating at 9.6, 4.8 or 2.4 kb/s. When the count of counter 454 reaches 0, a positive output from the counter 454 is applied to the data input of a flip-flop 456 so that upon the next clock pulse 448 the flip-flop 456 applies a pulse through NOR gate 458 to the clock input of an octal register 460 to transfer the parallel output of the shift register 452 to the register 460 so that it may be subsequently read by the computer.

Control codes transmitted over customer lines have their last bit coded as a bipolar violation, i.e., the sixth bit for 2.4, 4.8 or 9.6 kb/s or the seventh bit 456 kb/s is a 1 which has the same polarity of the previously received 1 bit. In order to recognize the bipolar code violation, the rail inputs 434 and 436 are connected to the respective j and k inputs of a flip-flop 462 which is clocked by the trailing edge of the positive clock signal 450. Thus, the flip-flop 462 stores the polarity of the last received bipolar 1 by producing a high non-inverted output when the last pulse was positive and by producing a high inverted output when the last pulse was negative. The non-inverted output of the flip-flop 462 is connected to one input of a NAND gate 464 along with the positive rail line 434 so that an incoming one on line 434 will produce a 0 output from NAND gate 464 if the previously received one was also a positive bipolar bit. Similarly, the inverted output of flip-flop 462 is connected to one input of a NAND gate 466 which has its second input connected to the negative rail line 436 to produce a low output from NAND gate 466 if the previously received bipolar bit was negative to indicate a bipolar violation. A 0 on the output of either NAND gate 464 or 466 is applied to a not OR gate 468 which produces a one applied to the serial input of a serial-in parallel-out shift register 470 to produce a one bit in the shift register 470 during the entry of the sixth or seventh bit into the register 444. The last received bit in register 444 and the just received bipolar code violation bit in register 470 are applied to inputs of an NAND gate 472 which, upon the positive edge of the inverse clock signal 374 clears the register 444. This replaces the XOV violation code with 0s for being shifted into the register 452. Simultaneous with the presentation of the last bit of the incoming byte on the third output of the register 444, the code violation bit in register 470 is presented on its third output which is applied to the data input of a flip-flop 474 so that upon the next clock pulse 448 the inverted output of the flip-flop 474 goes low to apply a low through AND gate 476 to the most significant bit of octal register 460. In the absence of a bipolar violation, the most significant bit input of register 460 is held high to indicate that the incoming byte is a data byte and not a control code.

The bipolar violation control bit in shift register 470 is also utilized to synchronize the counter 454 relative to the incoming bytes. The fourth stage of the shift register 470 has its output connected to one input of a NAND gate 478 which controls both inputs of a NAND gate 480 to apply a signal to a second input of the NOR gate 458. The output of the NOR gate 458, in addition to transferring the parallel data from the shift register 452 into the octal register 460, also applies a signal to the load input of counter 454 to begin the bit counting cycle for a byte of incoming customer data. The output on the fourth stage of the shift register 470 is also applied to one input of a NAND gate 482 which has its other input connected to the inverse clock signal 374 to clear the register 470.

Referring back to FIG. 5, the full wave rectified output on line 214 is applied by an inverter 484 through a diode 486 to an integration circuit formed by a parallel capacitance 488 and resistance 490 connected across the input of an inverter 492. The resistance 490 and capacitance 488 are selected to maintain a charge on the capacitance 488 for a few seconds. However, in the absence of any incoming signal over an extended duration, the capacitance 488 discharges producing a high output from inverter 492 on line 494 which, as shown in FIG. 18, operates inverter 496 to clear the shift register 452. Additionally, the low output on inverter 496 disables AND gate 476 to apply 0 to the most significant bit of the octal register 460. Thus, only 0s are loaded into the octal register 460 when there is no incoming customer signal. The outputs of the fourth, fifth and sixth stages of the shift register 452 are connected to respective inputs of a NOR gate 498 which controls an inverter 500 to disable the AND gate 478 and prevent extraneous incoming signals that may be detected from affecting operation of the counter 454. Additionally, the output of the inverter 496 is connected to the preset input of flip-flop 474 while the output of inverter 500 is connected to the clear input of flip-flop 474.

The microprocessor 342 is a conventional microprocessor, such as a 6801 or 6803-type eight bit microprocessor operating in an expanded multiplexed mode wherein port 3 is used for both the data bus and the low order address lines, and port 4 is used as the high order address lines. In this mode a eight bit latch 502 is employed to capture or demultiplex the low order address bits and an external memory, ROM 504, is used. An integration circuit 510, responsive to the turn on of power, operates serial inverters 512 and 514 to clear a monostable multivibrator 516 to apply a reset signal to the reset input of the microprocessor 342. A second monostable multivibrator 518, triggered by the reset signal, operates the monostable multivibrator 516 to clear the reset signal and begin operation of the microprocessor 342. The monostable multivibrator 416 operates as a watch dog timer which is retriggered during proper operation of the microprocessor 342 by output P13; however, if a malfunction occurs such as by a voltage spike or other condition, the monostable multivibrator 516 would time out resulting in resetting of the microprocessor 342. Resistances and capacitances are connected to the circuit units 516 and 518 to form suitable timing periods for the monostable multivibrators. Switches 520 and 522 and strap terminal pairs 524 and 526 are connected on one side to ground and on their opposite sides to respective inputs of the microprocessor 342 which are biased positive by resistances 528. The switches 520 and 522 are utilized to select a customer remote channel test option and a customer remote test control option, respectively. When the switch 520 is closed, the customer remote channel test option permits an incoming network data service unit loopback control code to operate simplex current change facilities on the customer lines. When the switch 522 is closed the customer remote test control option permits the transmission of a data service unit loopback control code on the outgoing network lines in response to an incoming data service unit loopback control code from the customer. The strap options 424 and 426 determine the customer data rate; for example, both straps 524 and 526 present equals 56 kb/s, strap 526 only equals 9.6 kb/s, strap 524 only equals 4.8 kb/s, and no strap equals 2.4 kb/s.

The higher address outputs of the microprocessor 342 operate a decoder 530 which in turn generates control signals on output lines operating input and output registers for reading data to and from the data bus. For example, output line 532 from decoder 530 operates the tristate octal register 460, FIG. 18, to enable the microprocessor 342 to read an incoming customer byte.

The clock circuit 66 of FIG. 14 also contains a pair of counters 536 and 538 together with a flip-flop 540 for dividing the 1.344 telephone network reference clock signal on line 322 to obtain a 64 khz clock on line 542 and an inverse 64 khz clock on line 544. The synchronizing clear signal on line 358 is applied by respective AND gate arrangements 546 and 548 to load inputs of the counters 536 and 538 to synchronize the 64 khz clock with the eight khz system clock. An inverter 550 connects the maximum output of counter 536 with a second input of the AND gate 546 to divide the signal by 3 while an inverter 552 connects the maximum output of counter 538 to a second input of the AND arrangement 548 to divide the count further by 7. The flip-flop 540 has its preset input driven by the inverter 552, while the three least significant outputs of the counter 538 drive a gating arrangement formed from inverters 554 and 556 and a NAND gate 558 to clear the flip-flop 540 upon receipt of the fourth pulse by the counter 538 from counter 536 after counter 538 has been preset. Thus, the flip-flop 540 generates a pulse on line 542 with a duty cycle of 4/7ths.

In the parallel to serial network output circuit 74, shown in FIGS. 17, a network data byte on data bus 534 from the computer 342 is transferred to a register 560 by a signal on decoder output line 562. The 8K network clock signal 78 is an inverted signal which enables the load input of a parallel-in serial-out shift register 564 so that upon the next 64 k clock pulse 542, the data byte in register 560 is transferred to the shift register 564 to begin the transmission of a serial binary data byte through NAND gate 566 which operates as a buffer inverter applying the signals to line 76 to the network. Additionally, the serial output of the shift register 564 is applied to the JK inputs of a flip-flop 568 clocked by the 64 k clock 542 to produce an output signal, inverted XBO, required by the telephone system.

In the serial to parallel circuit 82, FIG. 17, the incoming network serial data line 80 is biased positive by resistance 570 and applied by resistance 572 to the input of an inverter 574 which has its output applied to the serial input of a serial-in parallel-out shift register 576. The register 576 is clocked by the inverse 64 k clock 544. A octal register 578 has inputs connected to the parallel outputs of the shift register 576 and has its clock input connected to the 8K network clock line 78 so that upon the trailing edge of the 8K clock, the eight bits of data transferred into shift register 576 are loaded into the register 578 for being read subsequently by the computer 72 by operation of output 580 from decoder 530.

The parallel to bipolar violation encoding circuit 84, as shown in FIG. 18, has a register 582 for receiving a customer outgoing data byte from the data bus 534 upon a signal on line 584 from the decoder 530 of the computer, FIG. 17. The first seven bits of the customer byte in register 582 are transferred to a parallel-in serial-out shift register 586 by the sync pulse on line 344. The most significant or eighth bit of the customer output byte is selected to indicate a control code when 0 or low, and the corresponding output of the register 582 is connected to either the fourth (56 kb/s) or fifth (2.4, 4.8 and 9.6 kb/s) input of a parallel-in serial-out shift register 588. The other inputs of the shift register 588, including the fourth or fifth input which is not connected to the register 582, are biased positive. The shift registers 586 and 588 are clocked by the strobe 450 at the customer rate clock to produce corresponding serial outputs which are applied to respective inputs 590 and 592 of a programmable array logic circuit such as type PAL 16R6 programmable array logic circuit which converts the signals into respective positive rail signals on output line 596 and negative rail pulses on lines 598. The pulses or digital one states on line 590 are converted into alternating pulses on lines 596 and 598; 0's or absence of a pulse on line 590 produces 0's or absence of a pulse on both lines 596 and 598. An inverted pulse on line 592 indicating a control code results in the PAL 594 producing an XOV bipolar violation code; the last or X bit will be a one which has the same polarity (line 596 or 598) as the previous one, the next to last bit is always 0, and the second from last or X bit will be 0 or 1 of the proper polarity depending upon whether an even or odd, respectively, number of ones have been produced since the last XOV violation code.

Figure 19:
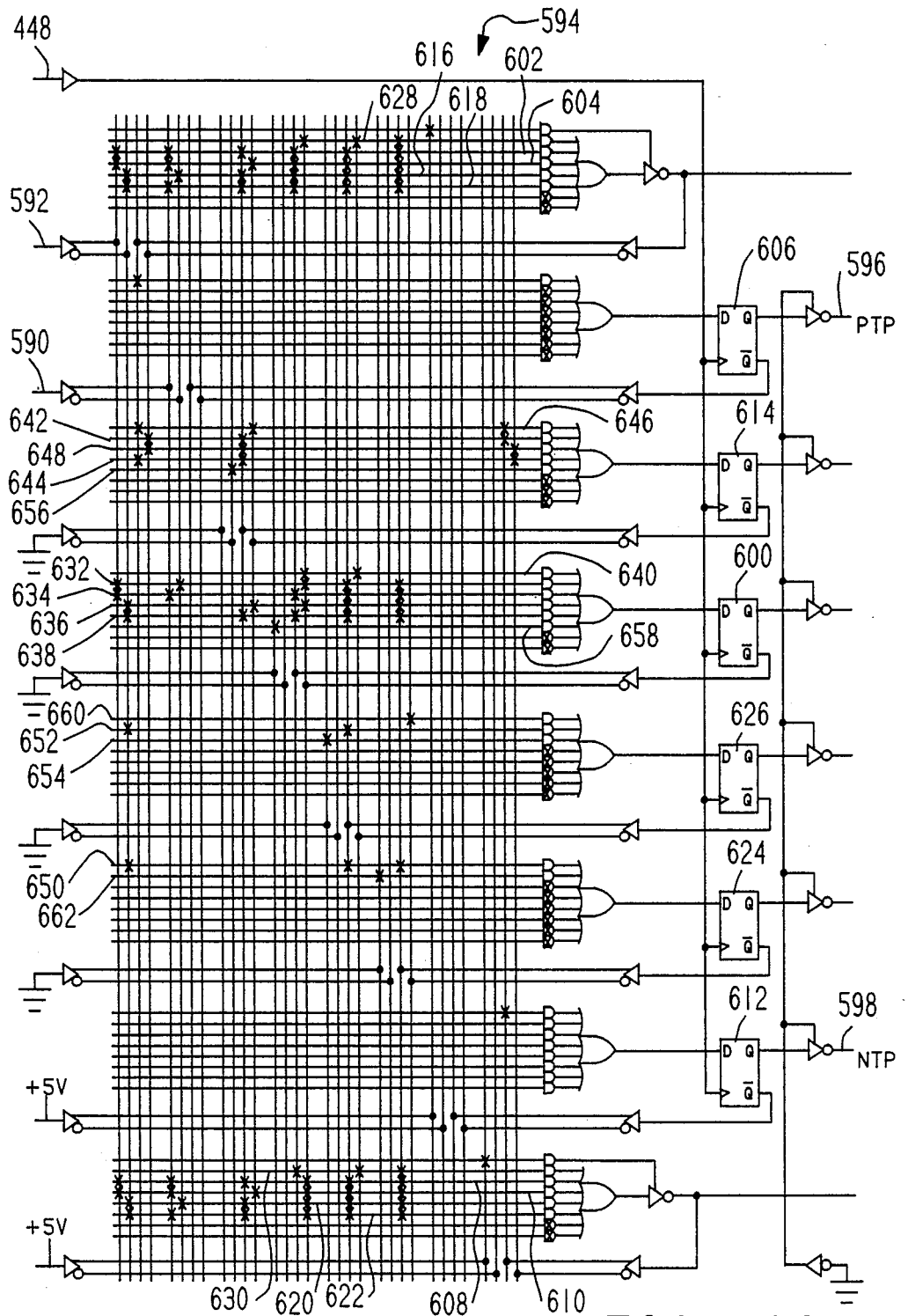
FIG. 19 is a logic diagram of a programmable array logic unit of FIG. 18.

As shown in FIG. 19 the PAL 594 contains vertical lines connected to the inputs and outputs of gates and flip-flops therein which are selectively connected, during programming of the PAL, to horizontal lines forming groups of AND gates, each group of AND gates driving one OR gate which drives an output inverter or flip-flop. Flip-flop 600 indicates the polarity of the last output pulse, i.e., whether the last pulse was produced on positive transmission pulse line 596 or on negative transmission pulse line 598. If flip-flop 600 indicates that the last pulse was produced on line 598, the next input pulse on line 590 is gated over line 602 or 604 to operate flip-flop 606 to produce the next pulse on line 596; and if the flip-flop 600 indicates that the last pulse was produced on line 596, the next input pulse on line 590 operates gate line 608 or 610 to operate flop-flop 612 and produce the next pulse on line 598. Flip-flop 614 indicates whether an odd or an even number of pulses have been produced over the interval since the last XOV bipolar violation. If the flip-flop 614 indicates that an odd number of pulses have been produced since the last bipolar violation, then upon receipt of the pulse on line 592, gate line 616 or 618 drive flip-flop 606 to produce a pulse on line 596 when flip-flop 600 indicates that the last pulse was negative or on line 598, or gate line 620 or 622 drives flip-flop 612 to produce a pulse on line 598 when flip-flop 600 indicates that the last pulse was positive. If flip-flop 614 indicates that the number of pulses received is even, then no pulse is produced on either of lines 596 or 598. Following the pulse on line 592, flip-flops 624 and 626 are operated with the output of flip-flop 624 preventing any output pulse on lines 596 and 598. Upon the last bit (bit 7 for 56 kb/s and bit 6 for 2.4, 4.8 and 9.6 kb/s) flip-flop 624 is deactivated and flip-flop 626 drives either gate line 628 in response to flip-flop 600 indicating that the last pulse was positive to produce a positive pulse on line 596, or gate line 630 when flip-flop 600 indicates that the last pulse was negative to produce a pulse on line 598.

For driving flip-flop 600, AND gate line 632 maintains an operated state of the flip-flop 600 when the incoming bit 590 is 0 and gate line 634 causes the flip-flop 600 to change from the unoperated to an operated state when the incoming bit 590 is one. In response to the negative pulse on line 592, gate line 636 maintains the operated state of flip-flop 600 when flip-flop 614 indicates an even count, and gate line 638 causes flip-flop 600 to change from an unoperated to an operated state when flip-flop 614 indicates an odd count. Gate line 640 maintains the flip-flop 600 in an operated state during the last two bits, OV bits, of a bipolar violation code.

For driving flip-flop 614, gate lines 642 and 644 produce changes in state of the flop-flop 614 when a pulse is produced on either of the lines 596 or 598. Gate line 646 and 648 maintain the state of flip-flop 614 when 0s are produced on both lines 596 and 598.

The flip-flops 624 and 626 are operated by respective gate lines 650 and 652 in response to the negative pulse on line 592. Upon the next clock pulse 448 flip-flop 650 reverts to its unoperated state while AND gate line 624, in response to the operated state of flip-flop 624, maintains the flip-flop 626 operated. Then during the last or V bit bipolar code violation, flip-flop 626 reverts to its unoperated state.

Additional gate lines 656, 658, 660 and 662 are provided for initializing the states of flip-flop 614, 600, 626 and 624.

Figure 4:
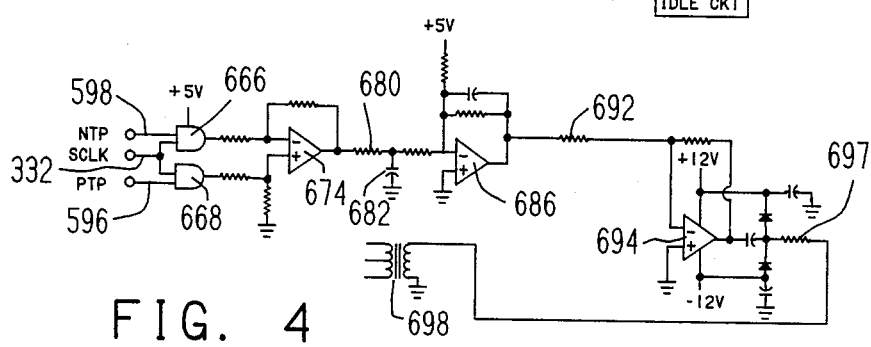
FIG. 4 is a diagram of a modified portion of the output circuit of FIG. 3.

The positive transmit pulse on line 596 and the negative transmit pulse on line 598 are passed to the bipolar output circuit 54 as shown in FIG. 3. The circuit 54 is a line driver which converts these two signals into a balanced bipolar signal having a 50% duty cycle return to 0 format, together with controlling the pulse amplitude and providing filtering. The lines 598 and 596 are connected to inputs of respective AND gates 666 and 668 which have second inputs connected to the customer rate clock 332 so that pulse inputs 598 and 586 are converted to output signals from gate 666 and 668 having a 50% duty cycle. These outputs are connected by resistances 670 and 672 to respective inputs of an operational amplifier 674 which has a bias resistance 676 and a feedback resistance 678 so that the two signals from the AND gates 666 and 668 are differentially added to produce a digital tristate or bipolar signal. The output of amplifier 674 is applied to a low pass filter formed by resistance 680 and capacitance 682 to ground with the junction between resistance 680 and capacitance 682 connected by resistance 684 to the input of an amplifier 686 having a feedback resistance 688 designed to produce amplification of the signal as required to produce proper signal level on the line. The filter component 680 and 682 are selected in accordance with the customer rate; at 56 kb/s the low pass filter formed by resistance 680 and 682 can be eliminated utilizing the feedback capacitance 690 for the amplifier 686 to provide high frequency drop-off. The output of the amplifier 686 is coupled by a resistance 692 to the input of an operational amplifier 694 having a feedback resistance 696 for driving the output transformer 698 through a coupling capacitance 700. For customer rates of 4.8 and 9.6 kb/s, band elimination for 28 khz is provided by an amplifier 702 having its inverting input connected by capacitance 704 to a divider formed by resistances 706 and 708 across the output of the amplifier 686. The filter employs a feedback capacitance 710 connected between the output of the amplifier 702 and the junction of resistances 706 and 708, and employs a feedback resistance 712 to the inverting input of amplifier 702 to provide the proper signal level. Frequency components below 28 khz are eliminated by the capacitance 704 while high frequency components are eliminated by the feedback through capacitance 710 to thus produce an inverted band pass signal from amplifier 702 which is summed through resistance 714 with the signal through resistance 692 to the input of amplifier 694 for eliminating a frequency band at 28 khz to avoid interline coupling problems with customer lines carrying 56 kb/s. As shown in FIG. 4 for 2.4 kb/s, the low pass frequency formed by resistance 680 and capacitance 682 can be selected to adequately attenuate the 28 khz components to meet line specifications.

Transformer 698 is a 2:1 step down transformer. Zener diodes 718 and current limiting resistances 720 provide lightning protection for the line driver on the line side of transformer 698. Diodes 722 provide additional lightning protection on the primary side of transformer 698. Capacitances 724 provide high frequency filtering for the voltage supply to the line driver amplifiers.

Referring back to FIG. 17, the microprocessor 342 contains three additional outputs connected through buffer inverters 730, 732 and 734 to respective lines 736, 738 and 740 which are connected to circuitry in FIG. 3 for operating OCU and CSU loopback circuitry and idle indicating circuitry. The line 736 is connected by a resistance 742 to the base of a transistor 744 which drives a transistor 746 to operate a relay 748. When the relay 748 is operated, normally closed contacts 748a and 748b are opened to disconnect the customer lines 52 and 56 and normally opened contacts 748c are closed to establish a loopback connection between the customer output and input of the office channel unit for testing purposes. Additionally, operation of relay 748 opens normally closed contacts 748D and 748E in series with buildout switches 112 and 114, and closes contacts 748F and 748G in parallel with respective switches 116 and 118 to insert the line buildout attenuator formed by resistances 106 and 108 and capacitance 110 needed for short length lines into the loopback circuit. A light emitting diode 750 in series with a limiting resistance 752 is connected to the collector emitter circuit of the transistor 744 to indicate that the OCU unit is in the loopback mode.

The line 738 is connected by a resistance 754 to the base of a transistor 756 which drives a transistor 758 operating a relay 760 which controls the polarity of the simplex current. In the simplex circuit 86, the plus battery terminal is normally connected through current limiting resistance 762, choke 764 and normally closed contact 760a of the relay 760 to the center tap of the primary winding of the transformer 120 while the negative battery terminal is connected through current limiting resistance 766, choke 768, LED of optical coupler 770, current limiting resistance 772, and normally closed contacts 760b of the relay 760 to the center tap of the secondary winding connected to transmit lines 56 to thus bias the receive lines 52 positive relative to the transmit lines 56. Upon operation of the relay 760, the contacts 760a and 760b are opened and normally opened contacts 760c and 760d are closed to reverse the polarity of the batteries applied to the receive and transmit lines 52 and 56. A light emitting diode 774 in series with a resistance 776 is connected in series with the collector and emitter of the transistor 756 for indicating that the CSU loopback mode is present.

The phototransistor of the optical coupler 770 is connected in series with a resistance 778 and to the base of a transistor 780 which is connected in series with a light emitting diode 782 and current limiting resistance 784 for indicating when no simplex current is in existence. A diode 786 is connected across the LED of coupler 770 and resistance 772 for protecting the coupler 770.

The line 740 is connected in series with a light emitting diode 788 and current limiting resistance 790 to indicate when the circuit is idle.

Figures 20, 21:
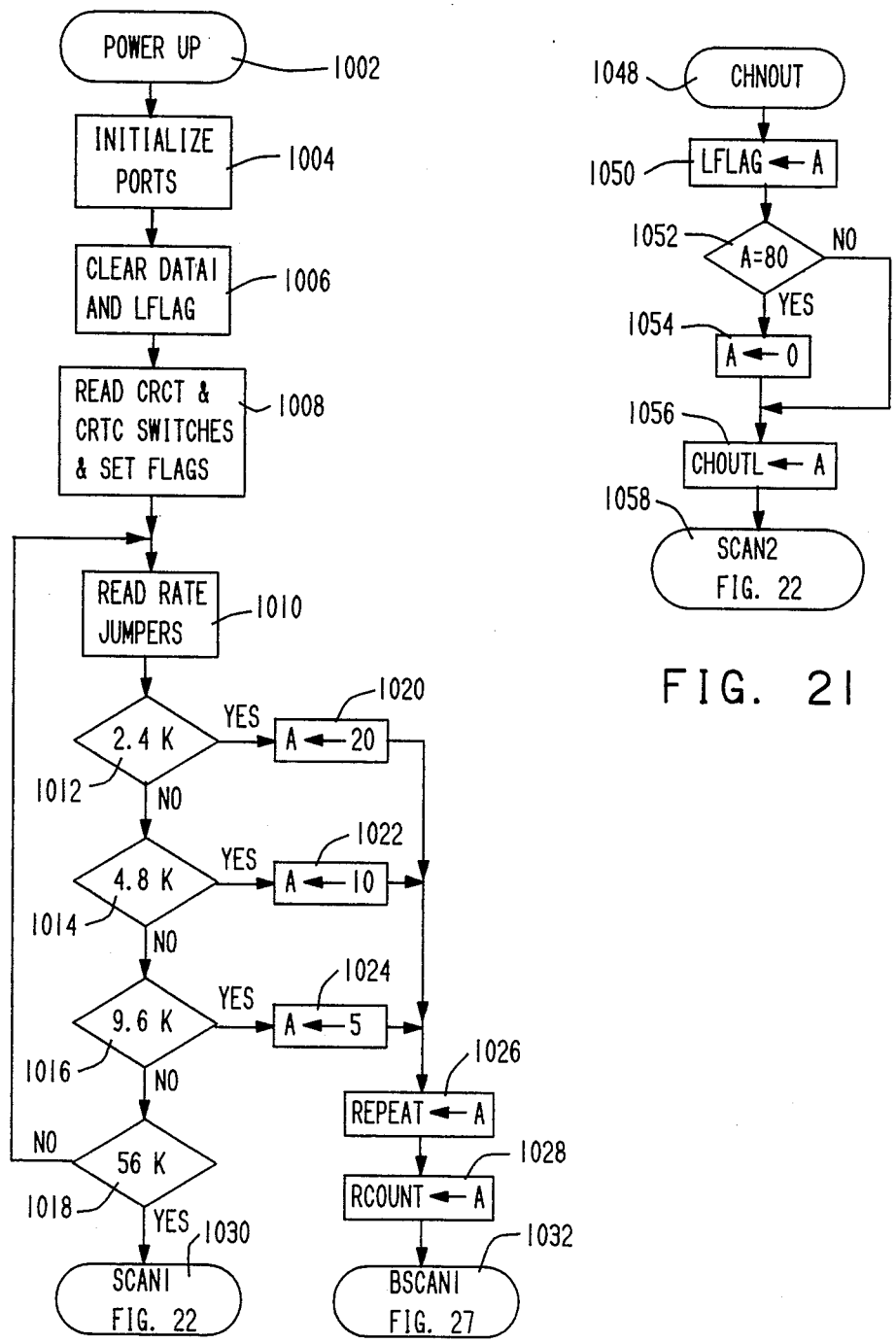
FIG. 20 is a step diagram of an initialization program utilized in the computer of FIG. 16.
FIG. 21 is a step diagram of a routine called by the program of FIG. 22.

A program for operating the computer 72 is illustrated in FIGS. 20-32 wherein FIG. 20 is the initializing program called by the reset vectors of the microprocessor. The program begins at point 1002 and proceeds to step 1004 where the ports of the microprocessor are initialized at input ports and output ports as required by the circuitry of FIG. 17. In the next step 1006, memory locations in the internal RAM are cleared. The switches 520 and 522 of FIG. 17 are then read in step 1008 and their condition stored in corresponding memory bits. In step 1010 the status of jumpers or switches 524 and 526 are read and their condition is compared in steps 1012, 1014, 1016 and 1018 with the corresponding states representing a customer data transmission rate of 2.4, 4.8, 9.6 and 56 kb/s, respectively. If any of the steps 1012, 1014, and 1016 is true, then the program branches to the corresponding step 1020, 1022 or 1024 where the number of byte repeats, 20, 10 or 5, are loaded into the microprocesor register for storage in step 1026 in a RAM location, REPEAT and then in step 1028 into a RAM counter, RCOUNT. If the 56K customer rate is true in step 1018, the program jumps to the scan routine SCAN1 at point 1030 in FIG. 22. If one of the subrates is true, then the program from step 1028 jumps to the routine BSCAN1 at point 1032 in FIG. 27.

Figure 22:
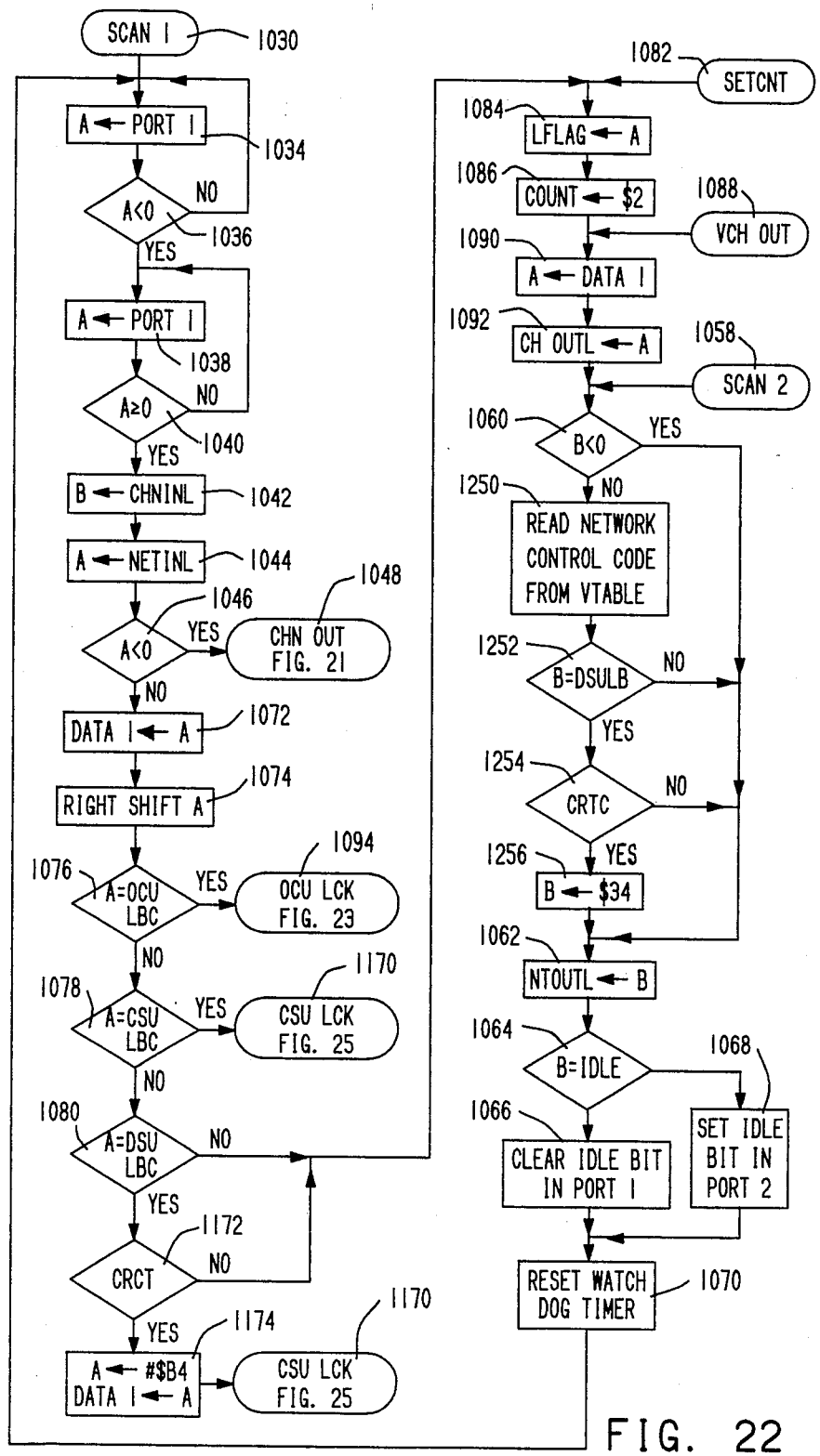
FIG. 22 is a step diagram of a main computer program loop utilized in the computer of FIG. 17 when the customer data rate is 56 kb/s.

Point 1030 in FIG. 22 is the entry point for the main program loop for operating at 56 kb/s. In steps 1034 and 1036 the program reads the line 78 which carries the network 8K negative clock pulse, and recycles when this line is not high. When the line 78 is high indicating that the 8K clock pulse is not present, the program proceeds to steps 1038 and 1040 where the program recycles until the beginning of the negative sync clock pulse on line 78. Once the beginning edge of the negative clock is sensed, the program proceeds to step 1042 where the incoming customer data in register 460, FIG. 18, is read and then to step 1044 where the incoming network data byte in register 578, FIG. 17, is read. In the network input byte, bit 8, when low, indicates that the network byte is a control code, and when high indicates that the data byte is ordinary data. When the network input byte is data in step 1046, the program calls a routine CHNOUT 1048 in FIG. 21 wherein the network input byte is saved in a memory byte LFLAG for storing the last byte transmitted on the customer lines. In the next step 1052, the byte received from the network is compared with a network 0 suppression code and if true is changed to 0 in step 1054. From either step 1052 if false or from step 1054 the program proceeds to step 1056 where the byte received from the network is stored in the register 582, FIG. 18, for being transmitted to the customer. From the step 1056, the program returns to point 1058 of the main loop in FIG. 22.

At point 1058 the program at step 1060 tests the input byte from the customer for being a data byte, i.e., is bit 8 high indicating data. When true, the program branches to step 1062 where the customer input byte is written into the network output data register 560, FIG. 17. In the next step 1064, the customer data byte is compared with an idle code and if false the idle bit is cleared in step 1066. If step 1064 is true the idle bit is set in step 1068. The idle bit drives inverter 734 in line 740 in FIG. 17 to operate the idle indicating LED 788 in FIG. 3. From step 1066 or 1068, the program proceeds to step 1070 where the timer 516, FIG. 17, is reset prior to returning to the beginning point 1030 of the procedure SCAN1. In the event that a malfunction occurs, for example, such as could be caused by a sudden voltage spike, the microprocessor 342 could be possibly hung up and running of the timer 516 would reset the microprocessor to overcome the malfunction.

When the network data byte loaded in step 1044 is a control code, its eighth bit will be 0 resulting in step 1046 branching to step 1072 where the network byte is stored in a RAM memory location DATA1 recording the last network control code. The network byte in step 1074 is right shifted to remove the first bit and the remaining bits are compared in steps 1076, 1078 and 1080 to an office channel unit loopback code, customer service unit loopback code, and data service unit loopback code, respectively. If the control code is none of these, then the program proceeds to a point SETCNT 1082 where the shifted network byte is stored in a RAM memory location LFLAG flag in step 1084. In the next step 1086, the number 2 is loaded in a memory counter COUNT utilized for counting three successive loopback codes. From step 1086 the program proceeds to point 1088 where the byte stored in step 1072 is read in step 1090 and then transmitted in step 1092 to the customer output register 582 in FIG. 18. From step 1092 the program proceeds to point 1058.

Figure 23:
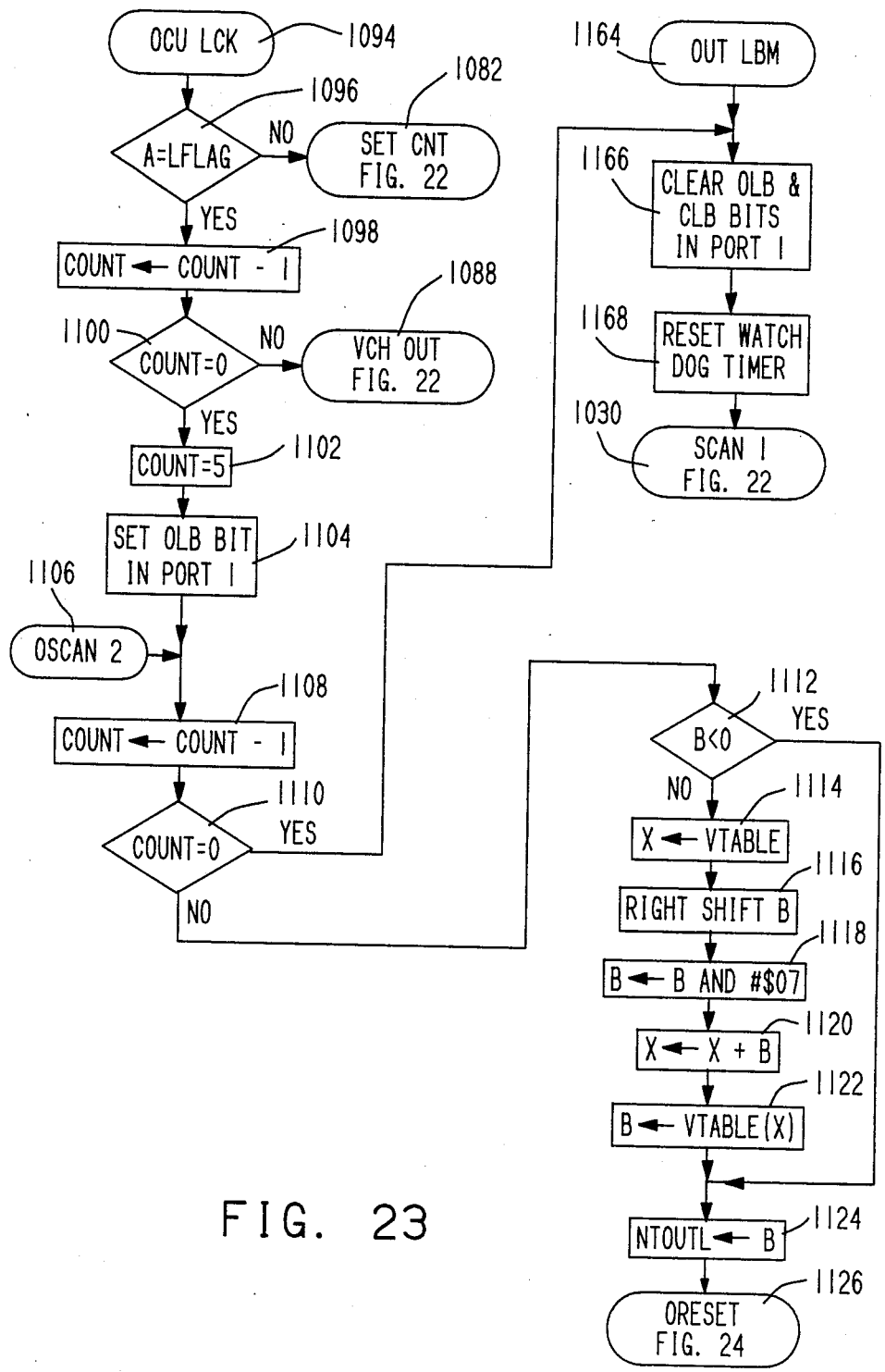
FIG. 23 is a step diagram of a program routine for operating under an office channel unit loopback mode which is called by the program of FIG. 22.

If the network input byte is found to be an office channel loopback code in step 1076, the program proceeds to point 1094 of the routine in FIG. 23 where step 1096 compares the left shifted network byte with the byte previously stored in step 1084. If false, the program returns to point 1082 of FIG. 22 for storing the current shifted byte in LFLAG and setting COUNT to 2. If step 1096 is true, COUNT is decremented in step 1098 with the program in step 1100 branching back to point 1088 in FIG. 22 until COUNT reaches 0. Thus, three successive office channel unit loopback code bytes must be received prior to proceeding to step 1102 where COUNT is reset to 5 and then step 1104 where the OLB bit is set driving inverter 730 and line 736 in FIG. 17 which operates the relay 748, FIG. 3, to open contacts 748a and 748b disconnecting the customer lines 52 and 56 and closing contacts 748c to establish a loopback circuit in the office channel unit. From step 1104 the program proceeds to point 1106 where step 1108 decrements COUNT. In the next step 1110, the program branches to step 1112 while COUNT remains greater than 0. In step 1112 the eighth bit of the customer data byte is checked to determine if the byte corresponds to a control or data code, and if the byte corresponds to a control code, the program proceeds to step 1114 where the memory address of Table II is loaded in the index register. This table contains the corresponding network control codes.

TABLE II

| Address | Network Control Code |
|---------|---------------------|
| FB8E | 01111001 |
| FB8F | 01000011 |
| FB90 | 10000100 |
| FB91 | 01010111 |
| FB92 | 01001001 |
| FB93 | 01011111 |
| FB94 | 01001101 |
| FB95 | 01111111 |

In step 1116 the customer byte is shifted right to get rid of the "don't care" lower significant bit and in step 1118 the five most significant bits are eliminated. The remaining three bits are added to the address in the index register in step 1120 so that in the following step 1122 the corresponding network control code can be loaded in register B from Table II. From step 1122 or from step 1112 if 1112 is true, the program proceeds to step 1124 where the network control code from step 1122 or the data byte read from register 460, FIG. 18, in step 1042 of FIG. 22 or from a similar step in the ORESET routine of FIG. 24 is transferred to the network output register 560, FIG. 17.

Figure 24:
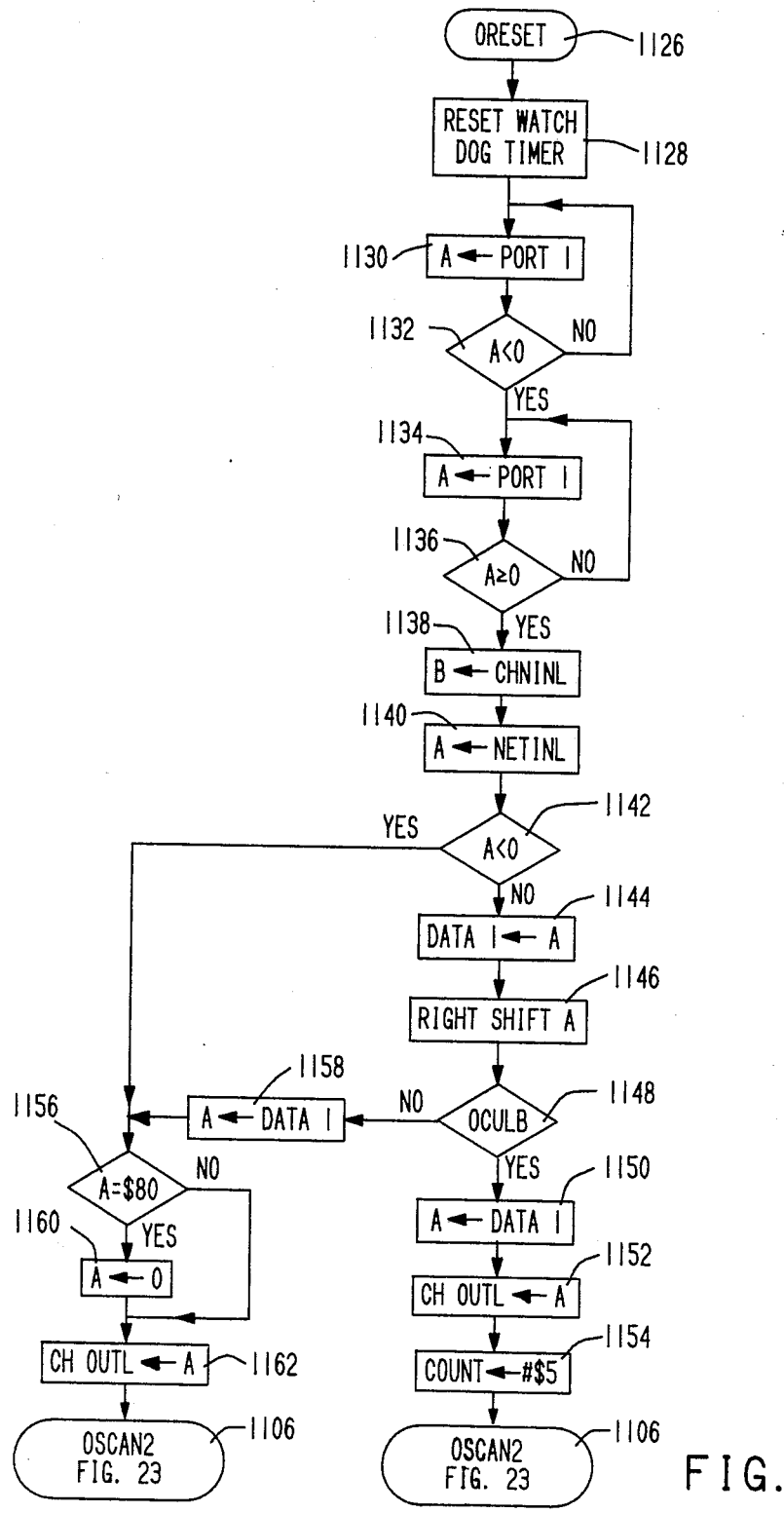
FIG. 24 is a step diagram of a further portion of the program routine of FIG. 23.

From step 1124, the program proceeds to point 1126 in the ORESET routine of FIG. 24 where step 1128 resets the watch dog timer similar to step 1070 in FIG. 22. The following steps 1130, 1132, 1134, 1136, 1138 and 1140 are similar to steps 1034, 1036, 1038, 1040, 1042 and 1044 of FIG. 22 for waiting until the leading edge of the next 8K timing pulse and inputting the incoming customer data byte into register B, which during office channel unit loopback will be the same as the outputted customer channel byte, and loading the incoming network code into the microprocessor register A. If the incoming network byte is a control code, step 1142 branches to step 1144 where the byte is stored in memory DATA1. Then in step 1146 the network byte is shifted left to eliminate the "don't care" bit with the remaining bits compared in step 1148 with the office channel unit loopback code. If true in step 1148 the program proceeds to step 1150 where the byte stored in step 1144 is reloaded into register A. This byte is then written to the customer output register 582, FIG. 18, in step 1152. The counter is reset to 5 in step 1152 and the program returns to point 1106 in FIG. 23. Thus, while the office channel unit loopback code continues to be transmitted to the office channel unit over the network input lines, the program continues to cycle through points 1106 and 1126.

If the network input byte in step 1142 is a data byte the program branches to step 1156. In step 1148, if the control code is not an office channel loopback code the program branches to step 1158 where the network byte stored in step 1144 is reloaded into the A register and the program proceeds to step 1156. In this step the network byte is compared with a network 0 suppression code and if true proceeds to step 1160 where a 0 is loaded into the A register. From step 1160 or from step 1156 if false, the program proceeds to step 1162 where the byte in register A is transferred to the customer output register 582. From step 1162 the program returns to point 1106 in FIG. 23. After receipt of five successive network bytes which are not an office channel loopback code, COUNT becomes equal to 0 and in step 1110 of FIG. 23 the program branches to point 1164 where step 1166 removes the bits driving inverters 730 and 732 and lines 736 and 738 of FIG. 17 to deenergize the relay 748 of FIG. 3 and thus discontinue the office channel loopback. From step 1166, the program proceeds to step 1168 where the watch dog timer is reset and then to the beginning point 1030 of the routine of FIG. 22.

Figure 25:
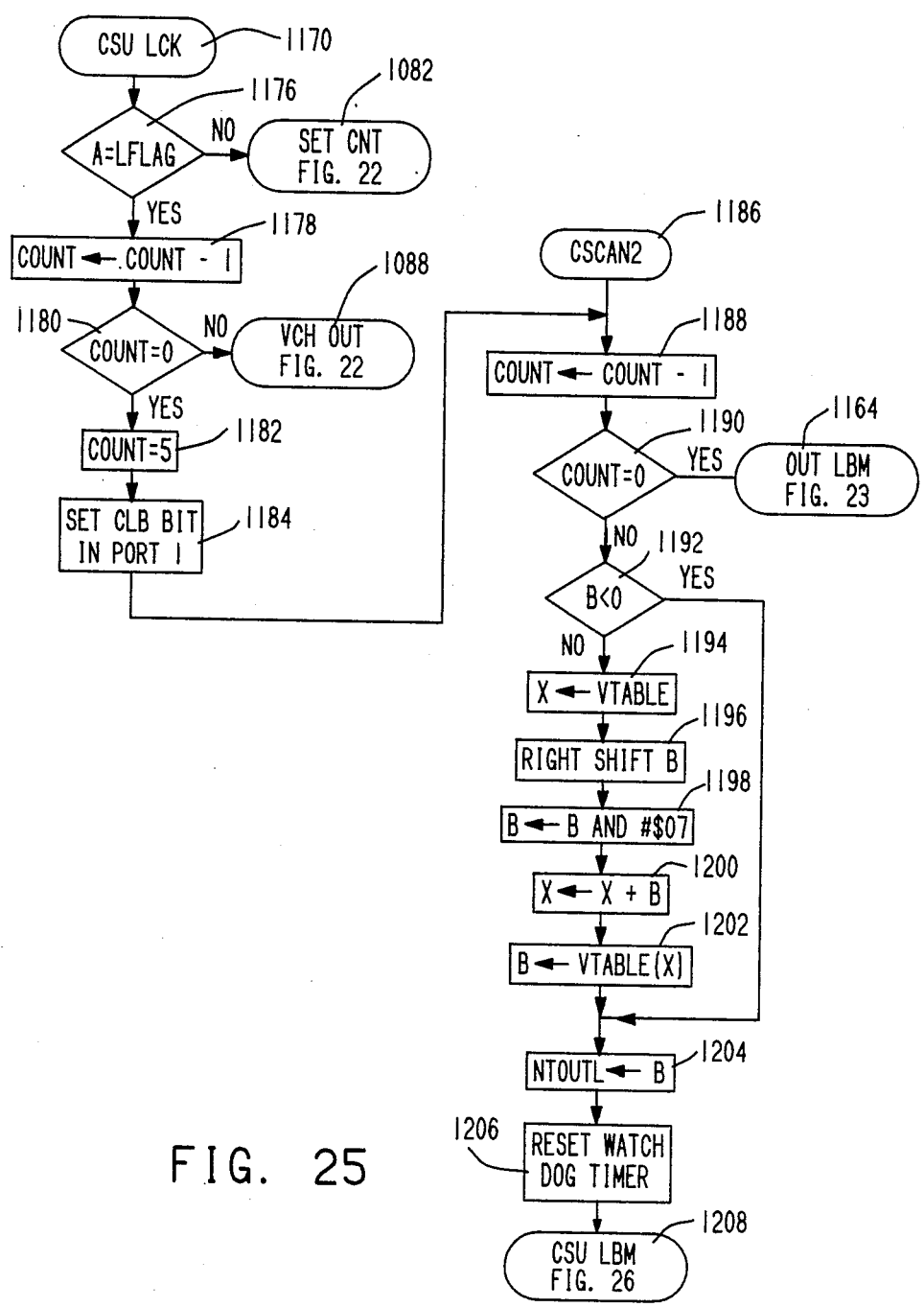
FIG. 25 is a step diagram of a program routine for operating under a customer unit or service unit loopback mode which is called by the program of FIG. 22.
Figure 26:
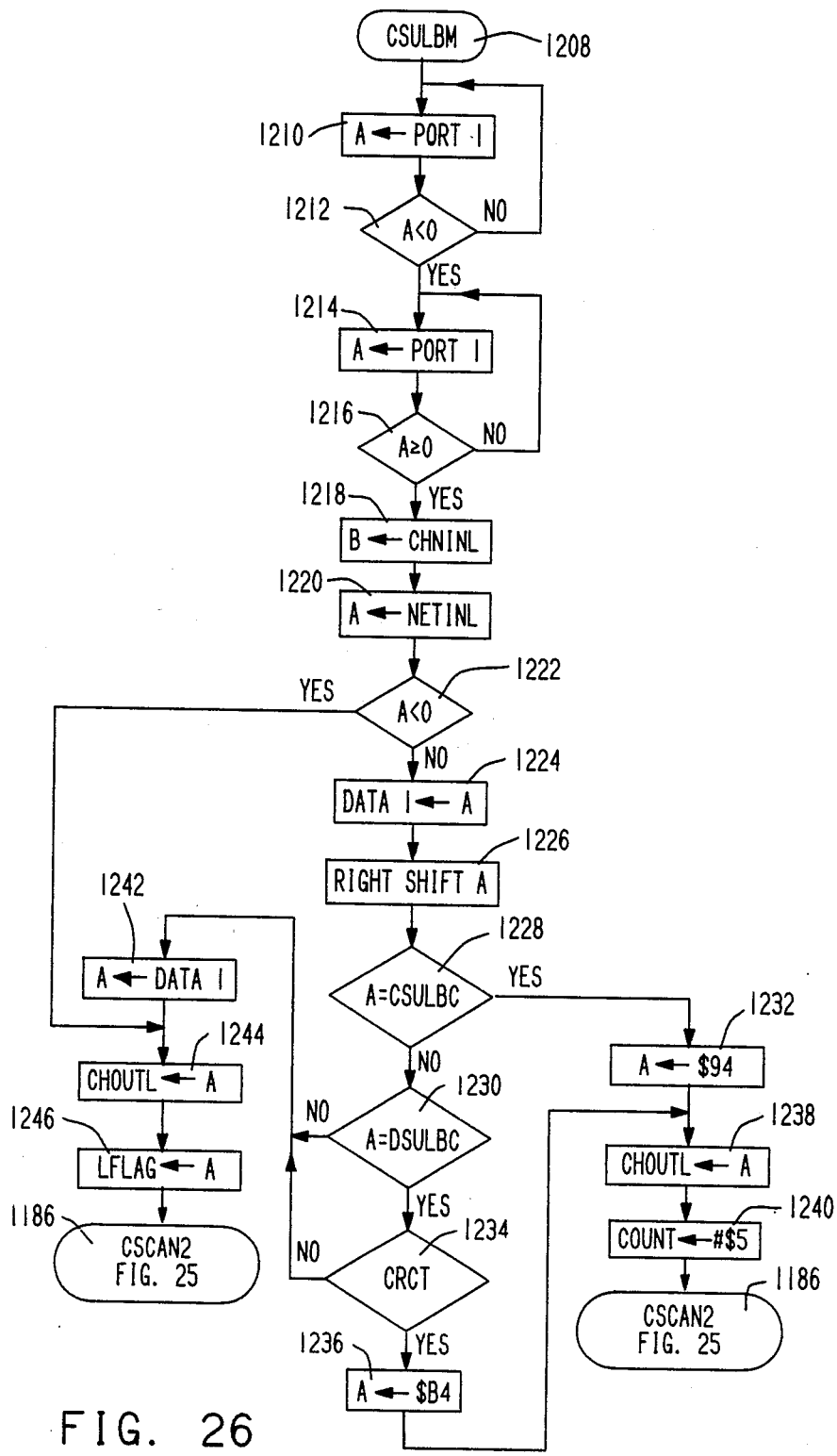
FIG. 26 is a step diagram of a further portion of the program routine of FIG. 26.

Referring back to FIG. 22, if the network input byte is a customer service unit loopback code, the program, in step 1078, branches to point 1170 in FIG. 25. Also in FIG. 22, if the network input byte is a data service unit loopback code, the step 1080 will be true branching to step 1172 where the status of the memory location relating to CRCT switch 520 is polled. If step 1172 is false the program branches to point 1082, and if true, the program branches to 1174 where the corresponding data service unit loopback code for being transmitted on the customer lines is loaded into the A register and then stored in the memory location data one. Then the program proceeds to point 1170 in FIG. 25.

Steps 1176, 1178, 1180 and 1182 of FIG. 25 are similar to steps 1096, 1098, 1100 and 1102 in FIG. 23 for requiring three successive customer service unit loopback codes or three successive customer service unit or data service unit loopback codes prior to setting COUNT equal to five and proceeding to step 1184 where the microprocessor 342 operates the inverter 732 to drive line 738 which in FIG. 3 operates relay 760. Contacts 760a, 760b are opened and contacts 760c and 760d are closed to reverse the polarity of the simplex current 86 applied to the receive lines 52 and transmit lines set 56. This reversal in simplex voltage causes the customer service unit or data service unit at the customer end of the line to establish a loopback circuit for enabling testing of the customer lines.

From step 1184 in FIG. 25 the program proceeds to point 1186 and steps 1188 and 1190 which, similar to steps 1108 and 1110 in FIG. 23 decrement COUNT to provide for a branch to point 1164 after five successive network input bytes which are neither a customer service unit loopback code or a data service unit loopback code. While COUNT is greater than 0 the program proceeds to the routine represented by steps 1192, 1194, 1196, 1198, 1200, 1202 and 1204 which is similar to the corresponding steps 1112, 1114, 1116, 1118, 1120, 1122 and 1124 in FIG. 23 for transferring the incoming customer data byte to the network output register 560, FIG. 17, if the byte is a data byte, or selecting the appropriate network control code from Table II and transferring this to the network output register if the customer data byte is a control code. In step 1206 the timer 516, FIG. 17, is reset and the program proceeds to step 1208 in FIG. 26.

The first seven steps of the routine in FIG. 6, namely, steps 1210, 1212, 1214, 1216, 1218, 1220 and 1222 are similar to the steps 1130, 1132, 1134, 1136, 1138, 1140 and 1142 of the routine in FIG. 24 for waiting until the rising edge of the 8K network clock pulse and then inputting the customer data byte from register 460 and the network data byte from register 578. If the network input byte is a control code, the circuit branches in step 1122 to steps 1224 and 1226 where the network data byte is first stored in memory DATA1 and then the byte is shifted left to remove the "don't care" bit. The shifted network byte is compared in the respective steps 1228 and 1230 to the network customer service unit loopback code and data service unit loopback code, respectively. If the network byte corresponds to the customer service unit loopback code in step 1228 the program proceeds to step 1232 where the corresponding customer control code for customer service unit loopback is loaded in register A. If the network byte is a data service unit loopback code in step 1230, the program proceeds to step 1234 where the CRCT option, the stored memory status of switch 522 in FIG. 17, is checked and if true proceeds to step 1236 where the corresponding customer code for data service unit loopback is loaded in register A. From step 1232 or step 1236 the program proceeds to step 1238 where the customer code for channel service unit loopback or data service unit loopback is transferred to the customer output register 582, FIG. 18. In the next step 1240 the count is reset to five and the program returns to point 1186 of FIG. 25.

If the network control code is neither a customer service loopback code in step 1228, nor a data service unit loopback code in step 1230 or if the control code is a data service unit loopback code in step 1230 but the CRCT option is not available in step 1234, then the program proceeds to step 1242 where the byte previously stored in step 1224 is again loaded in register A. From step 1242 or from step 1222 if the network input byte of step 1220 is a data byte, the program proceeds to step 1244 where the network input byte is output to the customer output register 582. In the next step 1246 the customer output byte is stored in memory LFLAG and the program proceeds to point 1186 of FIG. 25. After five successive network input bytes which are neither a customer service unit loopback code or a data service unit loopback code when the CRCT option is available, the program in step 1190 of FIG. 25 branches to point 1164 of FIG. 23 to discontinue customer service unit and data service unit loopback by discontinuing the signal on line 738, FIG. 17, which results in deenergization of relay 748, FIG. 3, to return the simplex voltage polarity on input and output terminals 52 and 56 to the non-loopback condition.

Referring back to FIG. 22, the program from step 1060 proceeds to step 1250 when the channel input byte from step 1092 corresponds to a control code. In step 1250 the corresponding network control code is read from Table II by a procedure identical to that shown by steps 1114, 1116, 1118, 1120 and 1122 of FIG. 23. The network control code is compared in the next step 1252 with the network data service unit loopback code and if false branches to step 1062. If true the program proceeds to step 1254 where the CRTC option, i.e., is the customer permitted to call for a data service unit loopback, is checked. If true the program proceeds to step 1256 where the corresponding network data service unit loopback code is loaded into the B register. If step 1252 or 1254 are false or from step 1256 the program proceeds to step 1062 where the network control code in register B is transferred to the network output register 560, FIG. 17.

The routines for operating at the subrates, 9.6, 4.8 and 2.4 kb/s, are illustrated in FIGS. 27-32. These routines differ from the routines of FIGS. 21-26 for 56 kb/s in that reading of the customer input register 460 and the network input register 578 and writing of the customer output register 482 are performed only once every fifth, tenth or twentieth 8K network clock pulse. Each customer input byte, once read and reformatted to network data or control codes, is repeatedly written to the network output register 560 for five, ten or twenty times. Additionally, the subrate customer data bytes, being only six bits in length, require different formatting by the microprocessor 342 than the seven bit 56 kb/s customer byte.

Figure 27:
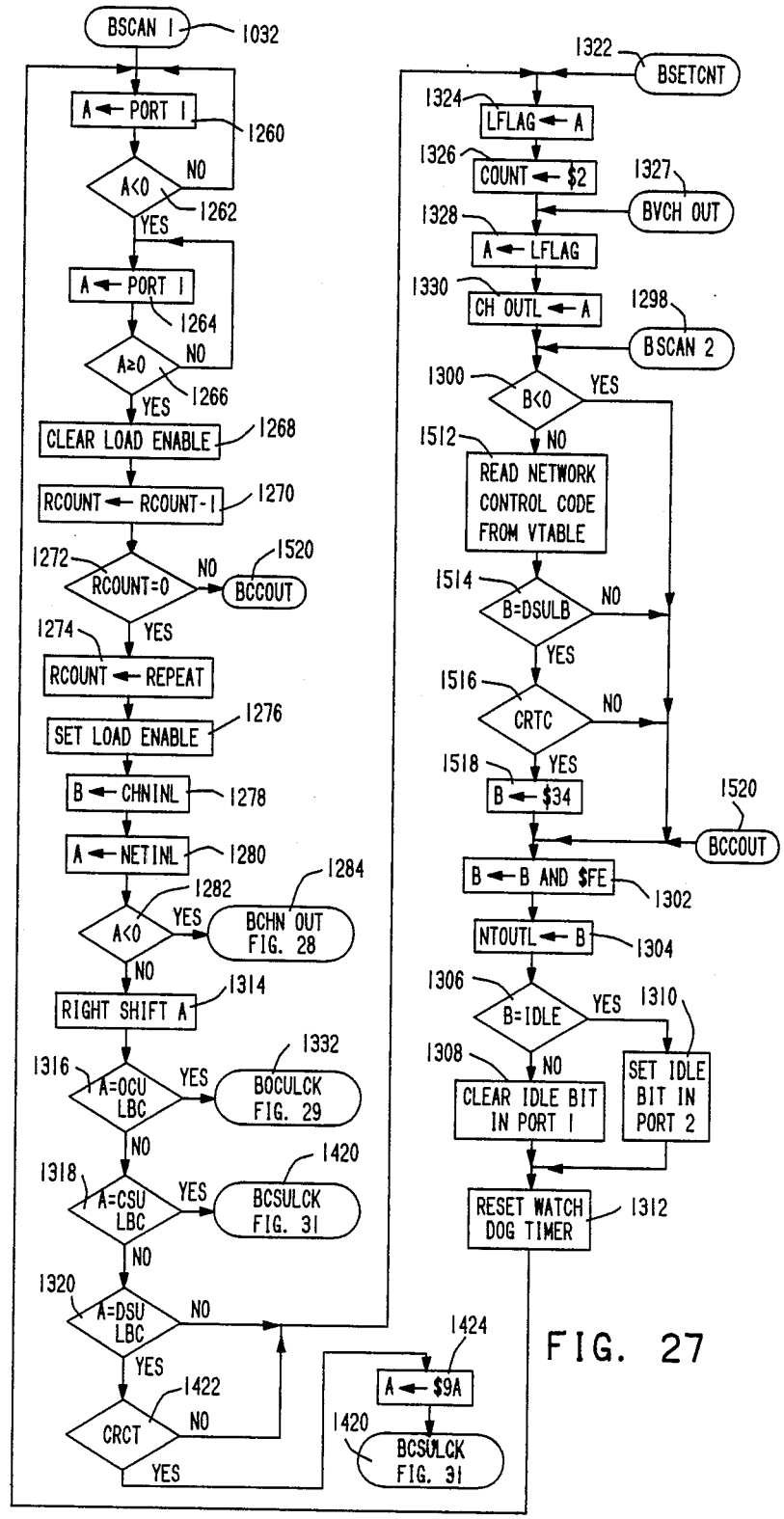
FIG. 27 is a step diagram of a main program loop called by the initialization program of FIG. 20 when the computer of FIG. 17 is operating in a customer data rate of 9.6, 4.8 or 2.4 kb/s.

In the main routine loop BSCAN1 called at point 1032 in FIG. 27, steps 1260, 1262, 1264 and 1266, similar to steps 1034, 1036, 1038 and 1040 of FIG. 22, detect the leading edge of the 8K network clock pulse. In the next step 1268 the load enable bit is cleared to disable the AND gate 340, FIG. 17, and prevent subsequent 8K clock pulses on lines 78 from passing to line 344. In step 1270, the count in RCOUNT is decremented, and then in step 1272 this count is checked for being equal to 0. When true, the program proceeds to step 1274 where the number of repeats, i.e., five, ten or twenty, is reloaded into RCOUNT. Then in step 1276, the load enable bit is set to enable AND gate 340 so that the next 8K clock pulse can pass through the AND gate. The timing from step 1266 to step 1267 is selected to be greater than the width of the 8K timing pulse so that the load enable bit will not be set during the 8K clock pulse. In the next steps 1278, 1280 and 1282, similar to steps 1042, 1044 and 1046, FIG. 22, the customer input byte and network input byte are loaded and the program branches to point 1284 of FIG. 28 when the network input byte is a data byte.

Figure 28:
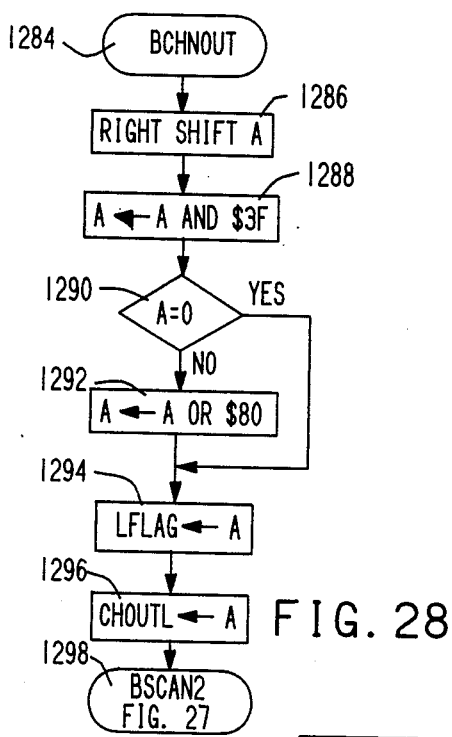
FIG. 28 is a step diagram of a program routine called by the program of FIG. 27.

In the routine of FIG. 28, the network byte is reformatted to produce a customer byte by shifting the byte one bit to the right in step 1286 and masking or eliminating the two left or most significant bits in step 1288 to thus form the customer six bit byte. When this byte is greater than 0 the program proceeds from step 1290 to 1292 where the eighth bit is made high. From step 1292 or from step 1290 if the byte in step 1290 is equal to 0, the program proceeds to steps 1294 and 1296 where the channel output byte is stored in memory and channel output register 582 prior to returning to point 1298 of FIG. 27.

At point 1298 in FIG. 27 the program tests the customer input byte in step 1300 and if the byte is a data byte, rather than a control code, the program branches to step 1302 where the right or lowest significant bit is masked prior to being ouputted in step 1304 to the network output register 560, FIG. 17. From the following step 1306 comparing the network output byte to an idle code, the program proceeds to step 1308 where the idle bit is cleared when the network output byte is not an idle code, or to step 1310 where the idle bit is set when the network output byte is an idle code. From steps 1308 and step 1310 the program proceeds to step 1312 where the watch dog timer 516, FIG. 17, is reset prior to returning to the beginning point 1032 of the routine of FIG. 27.

When the network input byte is a control code as indicated by bit eight being 0, the program proceeds from step 1282 to step 1314 where the network input byte is shifted right by one bit to eliminate the "don't care" bit, and then to steps 1316, 1318 and 1320 where the network input byte is compared to the office channel unit loopback code, the customer service unit loopback code, and the data service unit loopback code, respectively. If all of steps 1316, 1318 and 1320 are false, the program proceeds to point 1322 where the right shifted control code is stored in the memory location LFLAG in step 1324. Then the memory counter is set to two in step 1326. Then in step 1328 the shifted control code is reloaded into the microprocessor register A and transferred to the customer output register 582, FIG. 18, in step 1330 prior to proceeding to point 1298.

Figure 29:
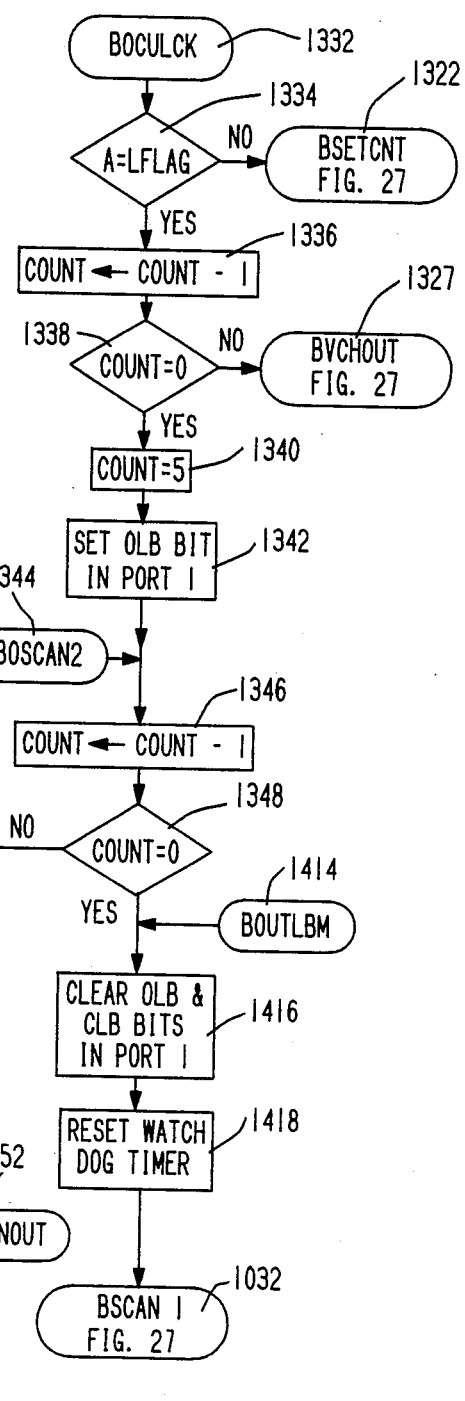
FIG. 29 is a step diagram of a program routine for operating under an office channel unit loopback mode which is called by the program of FIG. 27.

If the comparison for the office channel unit loopback code is true in step 1316, the program branches to step 1332 of the routine in FIG. 29 where the shifted control code is compared with the previous control code stored in LFLAG in step 1334. When step 1334 is false the program returns to point 1322 of FIG. 27 to store the present shifted control code in LFLAG and set the count at two. When step 1334 is true, the count is decremented in step 1336. In step 1338 the program branches back to point 1327 of FIG. 27 until the count reaches 0 indicating that three successive office channel unit control codes have been received whereupon the count is reset to five in step 1340. From step 1340, the program proceeds to step 1342 where the output of microprocessor 342 operates inverter 730 to produce an OLB signal on line 736 which operates relay 748 of FIG. 3 to open contacts 748a and 748b and to close contact 748c to establish a loopback circuit in the office channel unit.

From step 1342 the program proceeds to point 1344 which begins the program loop for operating while in an office channel unit loopback mode. In step 1346 COUNT is decremented and in step 1348, the program branches to step 1350 while COUNT remains greater than 0. In step 1350, the program braches to point 1352 when the customer input byte is a data byte as indicated by its bit eight being one. At point 1352, the first or least significant bit of the byte is made equal to 0 in step 1354 and then this customer byte is transferred to the network output register 560 in step 1356. When the customer input byte is a control code, the program proceeds through steps 1358, 1360, 1362, 1364 and 1366 wherein the second, third and fourth bits of the control code form a binary number which is added to the address of the network control code table so that the corresponding network control code can be selected from Table II in step 1366. From step 1366 the program proceeds to steps 1354 and 1356 to output the network control code.

Figure 30:
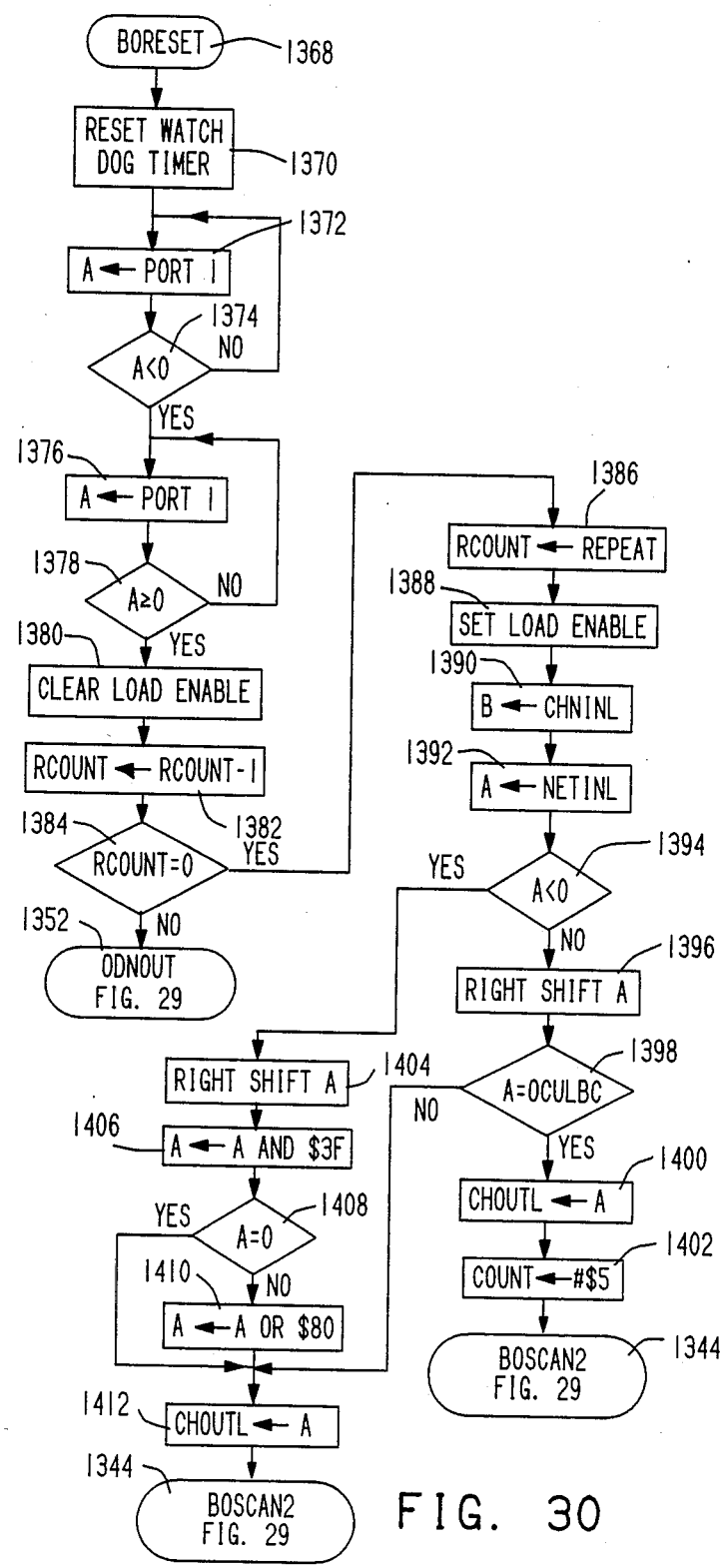
FIG. 30 is a step diagram of a further portion of the program routine of FIG. 29.

From step 1356, the program proceeds to point 1368 of FIG. 30 where the watch dog timer 516 is reset in step 1370. Then in steps 1372, 1374, 1376, and 1378, the program waits until the leading edge of the next 8K network clock pulse. From step 1378 the program proceeds to step 1380 where the load enable bit is cleared and then to step 1382 where the RCOUNT is decremented. In the following step 1384, RCOUNT, while greater than 0, results in a branch back to step 1352 of FIG. 29 to repeat the transmission of the incoming channel byte over the network output.

When the RCOUNT reaches 0, indicating that five, ten or twenty network 8K clock pulses have occurred, the program proceeds to step 1386 wherein the appropriate RCOUNT is restored. In step 1388 the program sets the load enable bit to enable AND gate 340 so that the next 8K network clock pulse can pass to sync line 344. The customer input byte from register 460 and the network input byte from register 578 are read in the next two steps 1390 and 1392. When the network input byte is a control code, the next step 1394 causes a branch to step 1396 where the network byte is shifted to the right one bit. This shifted byte is then compared with an office channel unit loopback code in step 1398, and if true results in advancing to step 1400 where the office channel unit loopback code is transferred to the customer output register 582 and then to step 1402 where the count is reset at five prior to returning to the beginning point 1344 of the office channel unit loopback procedure.

If the incoming network byte is a data byte, the program branches in step 1394 to step 1404 where the byte is shifted right one bit and then to step 1406 where the left two bits, bits seven and eight, are rendered 0. If the reformed byte from step 1406 is not equal to 0, then the program proceeds from step 1408 to 1410 where the eighth bit is rendered one to indicate that the byte is a data byte which is then transferred to the channel output register 582 in step 1412. When the reformed byte is 0, the program branches directly from step 1408 to step 1412 leaving the eighth bit 0 which will cause the PAL 594 to generate an XOV violation code and thus prevent transmissions of long strings of 0s over customer data lines. The program also branches directly from step 1398 to step 1412 when the network input byte is a control code which is not an office channel unit loopback code. From step 1412 the program proceeds to point 1344 at the beginning of the office channel unit loopback loop in FIG. 29.

When the count in step 1348 of FIG. 29 is found to be 0 indicating that five successive network input bytes have not been equal to an office channel unit loopback code, the program proceeds to point 1414 where the control outputs of microprocessor 342 are changed in step 1416 to clear any control signals on lines 736 and 738 setting the office channel unit in the office channel loopback mode or customer service unit loopback mode. From step 1416 the program proceeds to step 1418 where the watch dog timer is reset and then returns to point 1032 of FIG. 27.

Figure 31:
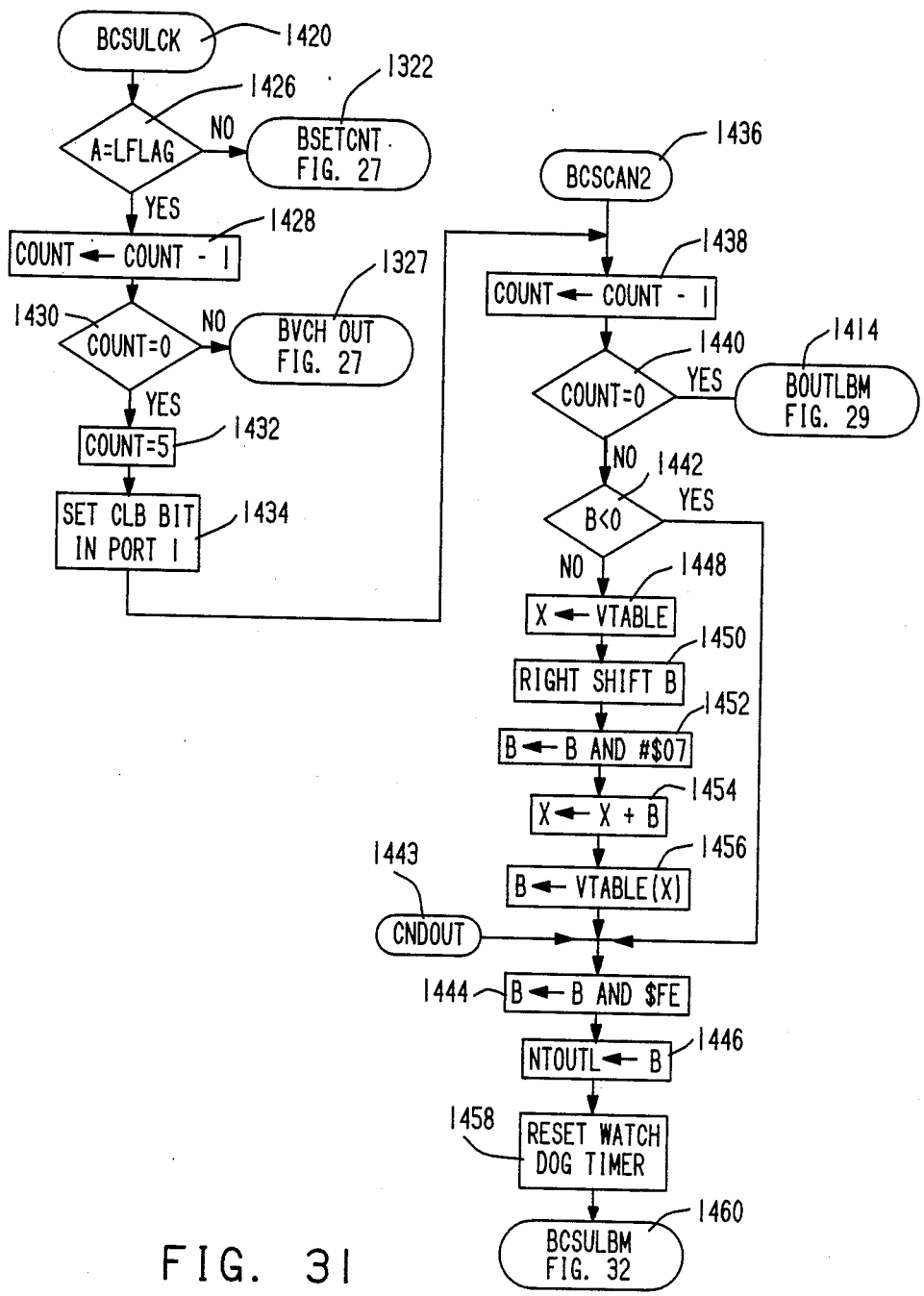
FIG. 31 is a step diagram of a program routine for operating under a customer service unit or data service unit loopback mode which is called by the program of FIG. 27.

When the network input byte is a customer service unit loopback code in the procedure of FIG. 27, the program at step 1318 branches to point 1420 of FIG. 31. Point 1420 will also be called when step 1320 is true for the presence of a data service unit loopback code and the CRCT option is found true in step 1422 indicating that the data service unit loopback mode is permissible for the connected customer lines. If step 1422 is false the program will go to point 1322. From step 1422 when true, the program proceeds to step 1424 where the customer data service unit loopback data byte is loaded into the A register prior to proceeding to point 1420.

From point 1420 in FIG. 31, the program proceeds steps 1426, 1428 and 1430 which, similar to steps 1334, 1336 and 1338 of FIG. 29, result in the requirement that three successive customer service unit or data service unit loopback codes must be received prior to going into the corresponding loopback mode. Once this requirement is met, the program proceeds from step 1430 to step 1432 where the count is set to five and then to step 1434 where the microprocessor 342 operates inverter 732 to produce a signal on line 738 which operates relay 760 in FIG. 3 to open contacts 760a and 760b and close contacts 760c and 760d to reverse the polarity of the simplex voltage applied to receiving lines 52 relative to transmitting lines 56. This reversal of simplex voltage will command the loopback mode in the customer service unit or data service unit.

The program then proceeds to point 1436 which is the beginning point for the program loop for operating in the customer service unit loopback or data service unit loopback mode. In step 1438 the count is decremented and while greater than 0 proceeds from step 1440 to step 1442 where the eighth bit of the customer input byte is tested. If the byte is a data byte as indicated by bit eight being one, the program branches to step 1444 where the lowest significant bit is made 0 and then to step 1446 where the byte is transferred to the network output latch 560. If the byte is found to be a control code in step 1442 the program proceeds through steps 1448, 1450, 1452, 1454 and 1456 which, similar to steps 1358, 1360, 1362, 1364 and 1366 of FIG. 29, retrieve the corresponding network control code from Table II. From step 1456 the program then proceeds to point 1433 and steps 1444 and 1446 where the network control byte is formatted and output on the network output latch. From step 1446 the program proceeds to step 1458 where the watch dog timer is reset and then to point 1460 of FIG. 32.

Figure 32:
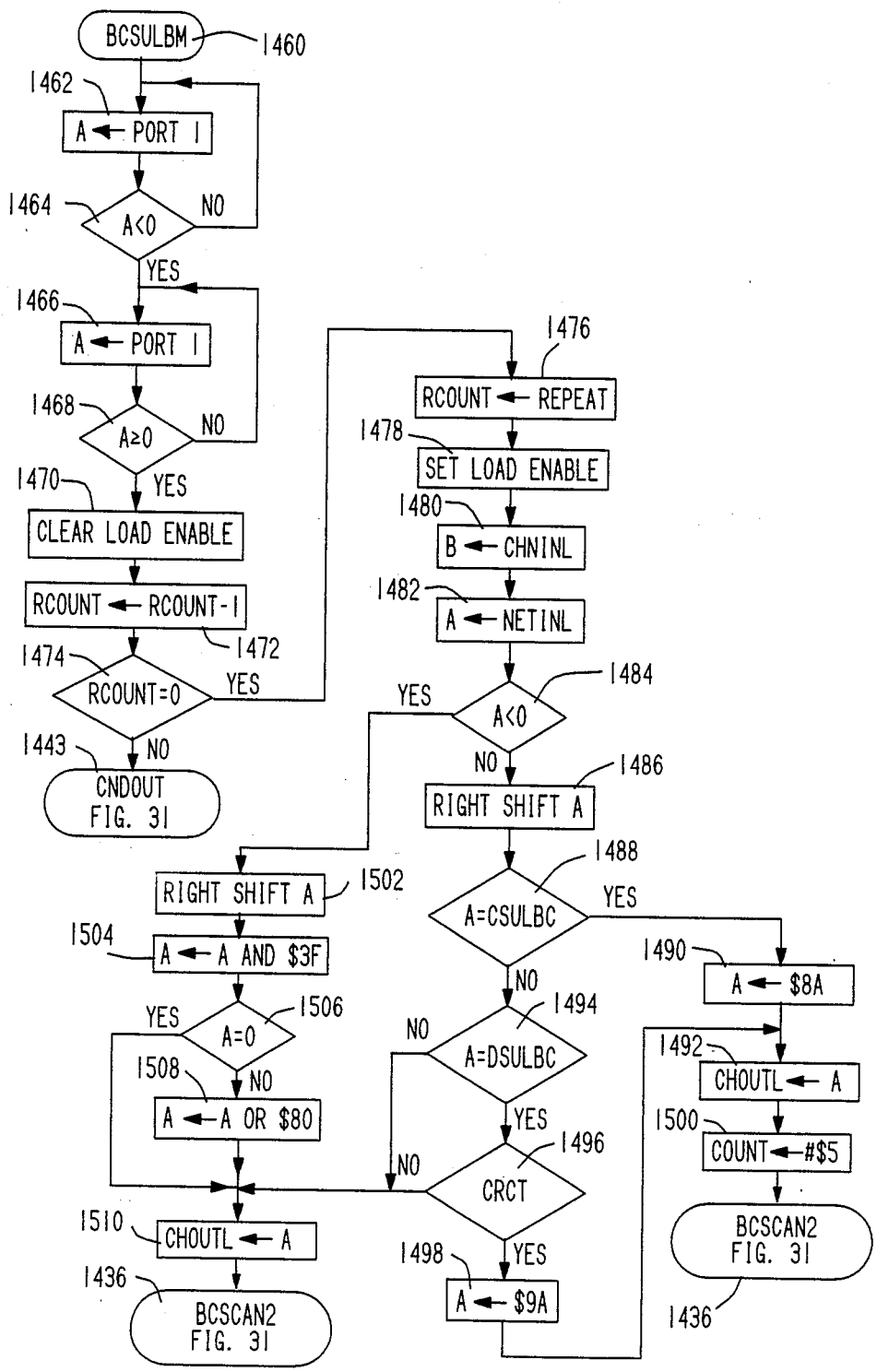
FIG. 32 is a step diagram of a further portion of the program routine of FIG. 31.

In the procedure of FIG. 32, steps 1462, 1464, 1466, 1468, 1470, 1472 and 1474 are similar to the steps 1372, 1374, 1376, 1378, 1380, 1382 and 1384 of FIG. 30 for detecting the leading edge of the next 8K clock pulse, clear the load enable gate, decrementing RCOUNT, and returning to point 1443 of FIG. 31 when RCOUNT is greater than 0 so that last input byte is transferred to the network output register for five, ten or twenty times, depending upon whether the customer data rate is 9.6, 4.8 or 2.4 kb/s. When RCOUNT becomes 0, the program branches from step 1474 to step 1476 where the RCOUNT is restored to five, ten or twenty, depending upon customer rate. In step 1478 the microprocessor 342 enables gate 340 to pass the next 8K clock pulse to line 344 which loads the customer output shift registers and provides a synchronizing signal for the customer and network rate clock circuits. In steps 1480 and 1482 the customer input byte and network input byte are read. If the network input byte is a control code, the program in step 1484 branches to step 1486 where the bits of the code are shifted right one bit and then to step 1488 where the shifted byte is compared to the customer service unit loopback code. If true, a customer service unit loopback data byte is loaded in register A in step 1490 and then transferred to the channel output register 582 in step 1492. If step 1488 is false, the program checks the code for a data service loopback code in step 1494 and if true proceeds to step 1496 where the CRCT option being present results in advancement to step 1498 where a data service unit loopback data byte is loaded into register A prior to proceeding to step 1492. After the data has been written to the customer output register, the program resets the count to five in step 1500 and returns to point 1436 of FIG. 31.

If the network input byte is a data byte, the program from step 1484 in FIG. 32 branches to step 1502 where the data byte is shifted right one bit and then to step 1504 where the two highest bits are made 0 to reformate the network data byte. If the reformatted byte is greater than 0, the eighth bit is made one in step 1508 to indicate a customer output data byte. From step 1508, from step 1506 if the data byte is 0, or from steps 1494 or 1496 if false, the program proceeds to step 1510 where the byte is transferred to the customer output latch 582 prior to returning to point 1436 of FIG. 31. It is noted that the hardware will convert the customer byte into an XOV violation code when bit eight is 0.

The program will continue to cycle through the routine beginning at point 1436 in FIG. 31 and continuing in FIG. 32 so long as the input bytes are customer service unit loopback codes or data service unit loopback codes. Once five network input bytes are received which are neither a customer service unit loopback code nor a data service unit loopback code, the count in step 1440 is found to be equal to 0 and the program branches to point 1414 of FIG. 29 where the loopback mode is terminated and the program returns to the beginning point 1032 of the main program loop of FIG. 27.

At step 1300 in FIG. 27, the program will branch to step 1512 when the channel input byte is a control code. In step 1512 the corresponding network control code is read from Table II such as by steps identical to steps 1358, 1360, 1362, 1364 and 1366 of FIG. 29. In step 1514 the network control code is compared to a data service unit loopback code, and if true, proceeds to step 1516 where the CRTC option is detected. The CRTC option tells if the data service unit loopback mode is available to the customer. If true, the program proceeds to step 1518 where the data service unit loopback data byte is changed to a corresponding network control code for being transmitted in the subsequent step 1304 to the network output latch.

In step 1272 if RCOUNT is not equal to 0, the program branches to point 1520 so that output of the network byte may be repeated for a number of times equal to RCOUNT.

The number of steps in the program, and the code required to proceed through the various routines, is selected so that the program will proceed from point 1030, 1130 or 1210 through a routine to point 1030, 1130 or 1210 when in the 56 kb/s mode, or will proceed from point 1260, 1372 or 1462 when in a subrate mode, in duration less than the duration between leading edges of successive 8K network clock pulses so that no reading of network or customer bytes is missed.

Figure 33:
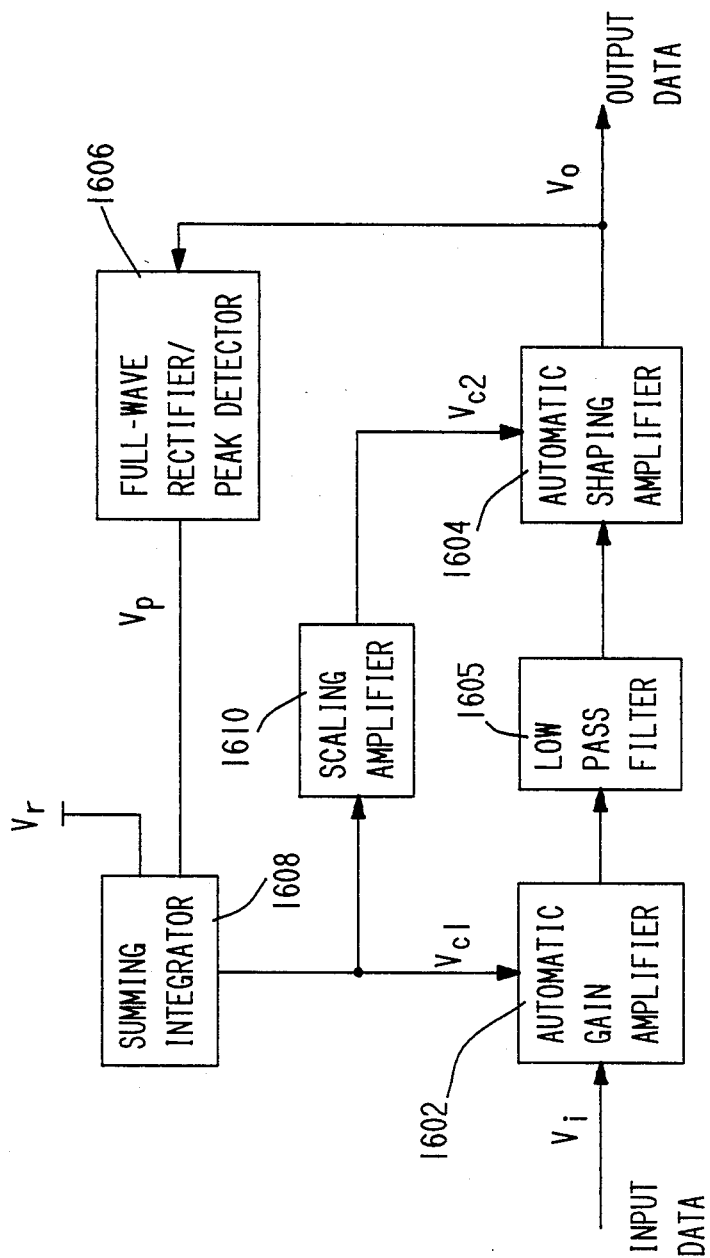
FIG. 33 is a block diagram of an automatic equalization and amplifying circuit for replacing automatic line buildout and fixed equalization circuitry of FIGS. 5, 6 and 7.
Figure 34:
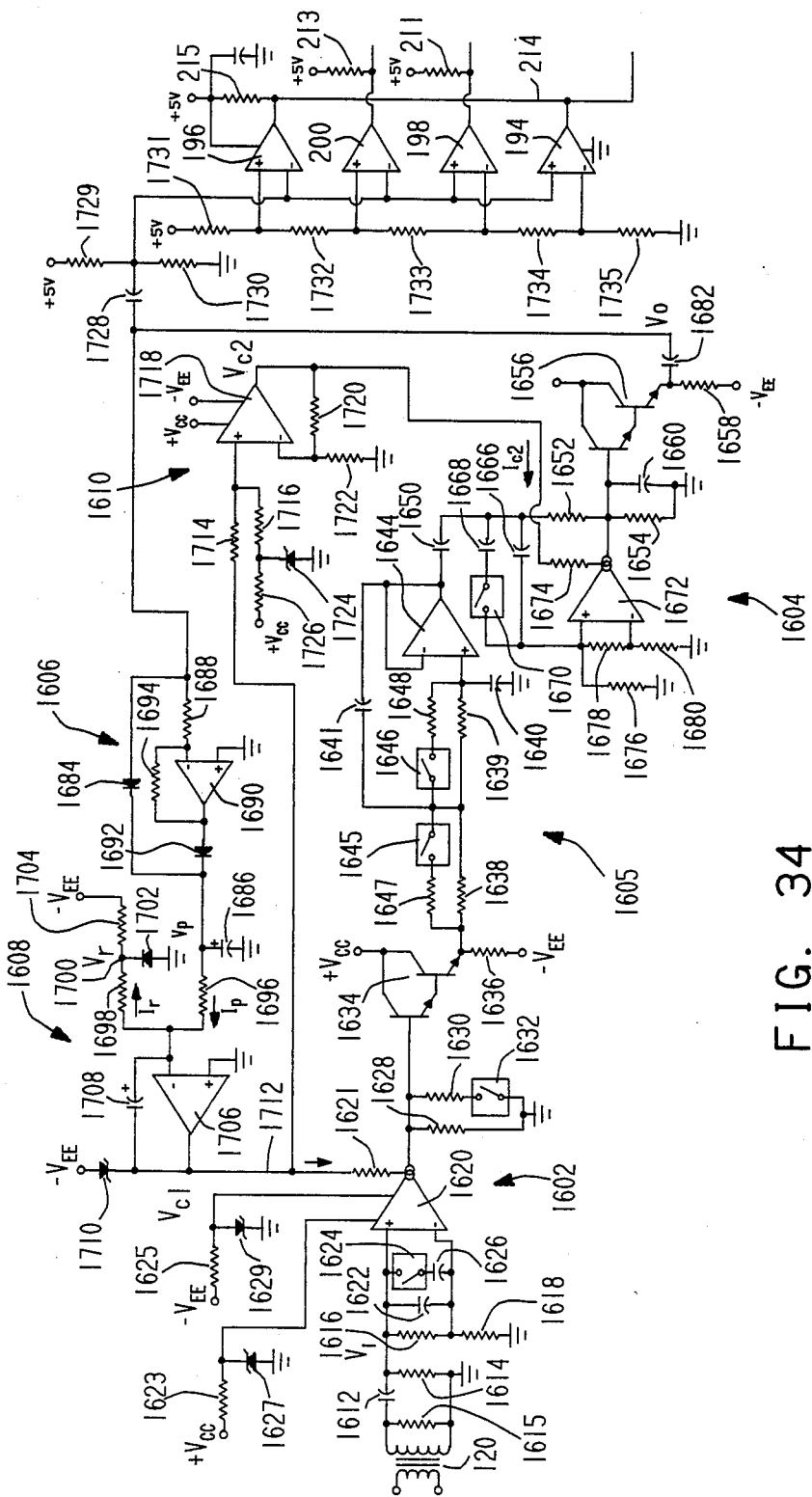
FIG. 34 is a detailed circuit diagram of the circuit of FIG. 33.
Figure 35:
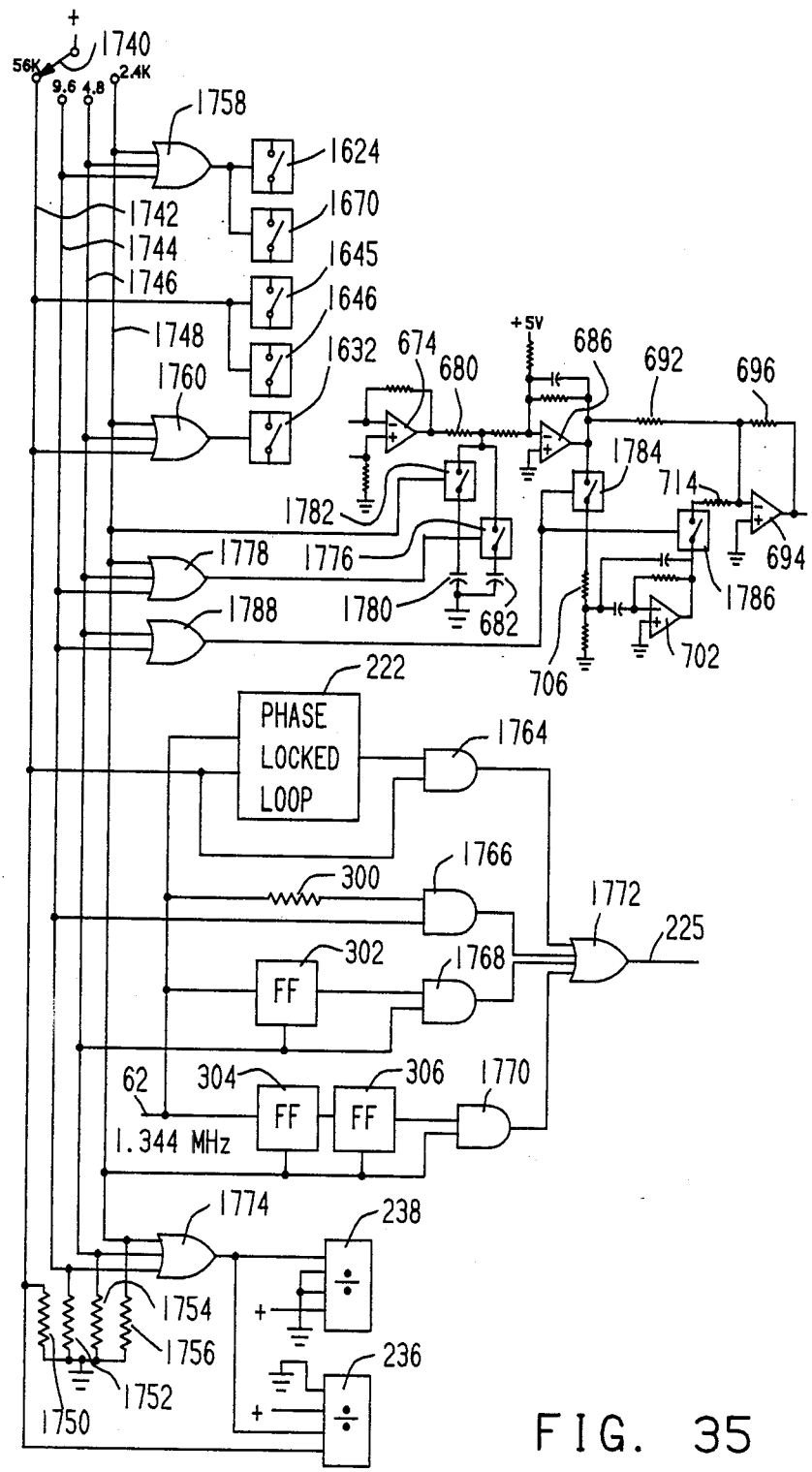
FIG. 35 is a circuit diagram of modifications utilized in the circuits of FIGS. 2, 3, 9, 10, 11 and 34 to enable the manufacture of an office channel unit operating at any of the customer rates of 2.4, 4.8, 9.6 and 56 kb/s.

In FIGS. 33, 34 and 35 there are illustrated modifications which can be made to the circuits of FIGS. 2-7, 9-11, 14, 17 and 18 in order to enable the manufacture of a single office channel unit which can be operated at any of the four customer rates, 56, 9.6, 4.8 and 2.4 kb/s.

The automatic line build-out and equalizer circuit of FIGS. 5, 6 and 7 is replaced with an automatic equalizer circuit shown in FIGS. 33 and 34. This circuit utilizes a dynamic change in the input/output transfer function of the equalizer circuit to counteract dispersive characteristics of the incoming cable rather than utilizing the more conventional approach of an automatic line build-out and fixed equalization. Additionally the dynamic range of the equalizer circuit enables elimination of the fixed attenuation pad of resistors 106 and 108 and capacitor 110 along with associated switches 112, 114, 116, 118, 748D, 748E, 748F and 748G. As shown in FIG. 33 equalization of the incoming data stream is accomplished by two cascaded amplifier stages 1602 and 1604 which are automatically controlled to shape their gain versus frequency response in order to counteract the losses of the incoming cable. The automatic gain amplifier 1602 applies generally frequency independent gain to the incoming data stream in order to counteract flat attenuation caused by the cable while the automatic shaping amplifier 1604 applies a frequency variable zero to the gain versus frequency response of the automatic equalizer to counteract frequency dependent signal attenuation. A low pass filter circuit 1605 is interposed between amplifier 1602 and 1604 to reduce high frequency noise.

The amount of frequency independent gain of amplifier 1602 and the frequency of the zero of the amplifier 1604 are automatically adjusted for proper equalization for different cable lengths by means of a feedback network through full wave rectifier/peak detector 1606, summing integrator 1608, and scaling amplifier 1610. The full wave rectifier/peak detector 1606 samples the output data streams and provides a DC signal $V_P$ to the summing integrator 1608 which is proportional to the peak level of the output Vo. The summing integrator compares $V_P$ with a fixed reference signal $V_R$ and outputs a control signal $V_{C1}$ which is used to set the flat gain of the automatic gain amplifier. In addition $V_{C1}$ is scaled through the scaling amplifier 1610 to provide a second control signal $V_{C2}$ which is used to control the zero frequency of the automatic shaping amplifier 1604.

Under steady state conditions for a given distribution cable length, the output data stream has a fixed peak amplitude. The output of the peak detector 1606 is thus a constant. Its amplitude under steady state conditions is equal in magnitude but of opposite polarity to $V_R$. Therefore the outputs of the summing integrator and the scaling amplifier, $V_{C1}$ and $V_{C2}$, are also constants. If the distribution cable length were to increase, the peak amplitude of the incoming data stream would decrease. This would tend to cause the peak level of the output data stream to decrease. However, the decrease in the peak level of the output data stream is detected by the peak detector 1606 causing $V_P$ to decrease. The summing integrater 1608 detects a change in $V_P$ and correspondingly increases $V_{C1}$ which causes $V_{C2}$ to also increase. As $V_{C1}$ and $V_{C2}$ increase, the gain of amplifiers 1602 and 1604 increase with amplifier 1602 increasing even amplification of high and low frequency components and with amplifier 1604 increasing amplification of high frequency components to decrease the frequency of the zero. The peak level of the output data stream increases until $V_P$ is again equal to $V_R$ and steady state conditions are reestablished.

Considering attenuation as a function of frequency for a fixed length of cable, the attenuation is relatively flat or constant over a lower frequency range but at frequencies above this range, the attenuation has a pole or starts to rapidly increase. As the cable length increases, the flat attenuation over the lower frequency range increases proportionally with the cable length. Also the frequency of the pole decreases at longer cable lengths to produce much greater losses in the higher frequency components. The gain of the automatic equalizer circuit of FIGS. 33 and 34 is even over the low frequency range to overcome the flat loss of the cable over the lower frequency range, but at the upper frequency, the gain of the equalizer has a zero, i.e., starts to rapidly increase with increasing frequencies above the zero, to overcome the pole of the cable. The frequency of the equalizer zero changes in correspondence to changes in the frequency of the cable pole with changes in cable length.

As shown in the detailed diagram of FIG. 34 of the automatic equalizer circuit, the automatic gain amplifier 1602 is coupled across the secondary of the input transformer 120 by a series capacitance 1612 and a parallel resistance 1614. A resistance 1615 across the secondary of the transformer sets the input impedance to the auto equalizer to about 540 ohms which sets the input impedance to transformer 120 to about 135 ohms. A pair of series resistances 1616 and 1618 are coupled across the resistance 1614 with the junction between resistances 1614 and 1616 coupled to the non-inverting input of an operational amplifier 1620 and with the junction between resistances 1616 and 1618 connected to the inverting input of the amplifier 1620. Resistances 1623 and 1625 and zener diodes 1627 and 1629 connect the amplifier 1620 to the positive and negative voltage supplies to provide a constant supply voltage. The gain of the amplifier 1620 is controlled by current through resistance 1621 from the control voltage $V_{C1}$. A capacitance 1622 is coupled across the inputs of the amplifier 1620. A switch 1624, closed when the incoming data rate is 2.4, 4.8 or 9.6 kb/s, connects a second capacitance 1626 across the inputs of the amplifier 1620. The output of the amplifier 1620 is connected across a parallel arrangement of a resistance 1628 and a resistance 1630 in series with a switch 1632 which is closed at 2.4, 4.8 and 56 kb/s.

Resistors 1614, 1616 and 1618 along with capacitances 1622 and 1626 form a single pole low pass filter which has a cut-off frequency set at 90 khz when switch 1624 is open and at 16 khz when switch 1624 is closed. The input impedance through the pass band of this low pass filter is set at about 540 ohms; thus setting the impedance at the input of the transformer to approximately 135 ohms. In addition, resistors 1614, 1616 and 1618 form a divider network which limits the peak voltage applied across the inputs of the amplifier 1620. For extremely short line lengths, the input data stream can have a maximum peak voltage of about 1.4 volts which results in a corresponding peak difference voltage applied across the amplifer inputs of about 55 millivolts. Resistors 1628 and 1630 are used to calibrate the range of gain achievable for the automatic gain amplifier over its specified range of transconductance. Switch 1632, open at 9.6 kb/s, increases the flat gain through the automatic gain amplifier by about 6 db.

An emitter follower formed by a Darlington transister pair 1634 and a resistance 1636 operates as a buffer to isolate the output of the amplifier 1602 from the active low pass filter 1605 formed by resistances 1638 and 1639, capacitances 1640 and 1641 and operational amplifier 1644. Switches 1645 and 1646, closed at 56 kb/s and open at 2.4, 4.8 and 9.6 kb/s, connect resistances 1647 and 1648 across respective resistances 1638 and 1639. The active filter 1605 places a pair of complex conjugate poles at about 12.5 KHz when switches 1645 and 1646 are open and at about 73 KHz when switches 1645 and 1646 are closed.

The output of the filter 1605 from amplifier 1644 is applied by a coupling capacitance 1650 to a voltage divider formed by resistances 1652 and 1654 which have their junction connected to an emitter follower formed by Darlington transister pair 1656 and emitter resistance 1658 for generating the output $V_0$. A capacitance 1660 is connected across the resistance 1654 to provide a further low pass filter to attenuate high frequency noise; the pole frequency is approximately 146 KHz.

The input voltage from coupling capacitance 1650 is also coupled by a parallel arrangement of capacitance 1666 and capacitance 1668 in series with switch 1670 to the non-inverting input of an operational amplifier 1672 which has a gain controlled by current through resistance 1674 driven by the control voltage $V_{C2}$. A voltage divider network formed by a parallel arrangement of a resistance 1676 and series resistances 1678 and 1680 15 is connected between the noninverting input of amplifier 1672 and ground with the junction of the resistances 1678 and 1680 connected to the inverting input of the amplifier 1672. The switch 1670 is closed at the low rates, 2.4, 4.8 and 9.6 kb/s and is open at the high rate, 56 kb/s. The output of amplifier 1672 is connected to the junction of resistances 1652 and 1654.

When $V_{C2}$ is low corresponding to relatively short input lines, the amplifier 1672 has low gain so that gain of the automatic shaping amplifier 1604 is generally frequency independent or flat from 0 frequency up to the high pole frequency of the network formed by resistance 1654 and capacitances 1660 for a gain of about −6 db. For increasing cable lengths, higher levels of control voltage $V_{C2}$ produce correspondingly increased gain in amplifier 1672 for higher frequency components of the signal to produce a frequency dependent gain in the output which closely offsets the frequency dependent losses of the cable. Thus, the shaping amplifier applies a zero to the gain versus frequency response of the automatic equalizer wherein the frequency of the zero decreases with increasing cable length to counteract the change in frequency dependent attenuation, and follow the decrease in frequency of the cable attenuation pole. The value of the resistance 1652 is selected to produce a suitable voltage range for $V_{C2}$ to produce variable gains in the amplifier 1672 so that the gain of amplifier 1672 can closely match the frequency dependent losses of different lengths of cable. Making resistance 1654 equal to resistance 1652 results in the low frequency and short cable length gain of −6 db for amplifier 1604. Increasing the gain of the amplifier with longer cable lengths produces the decrease in the transconductance zero of the amplifier 1604.

The output voltage $V_O$ taken from the emitter of transister pair 1656 through coupling capacitance 1682 is applied to the full wave rectifier and peak detector 1606 where positive pulses are applied through diode 1684 to one side of capacitance 1686 which has its other side connected to ground. Negative pulses are applied through input resistance 1688 to the inverting input of operational amplifier 1690 which has its output connected by diode 1692 to the non-grounded side of capacitance 1686. Feedback resistance 1694 of amplifier 1690 in conjunction with input resistance 1688 produce unity gain through amplifier 1690. The DC voltage $V_P$ produced across capacitance 1686 thus corresponds to the peak voltage.

The voltage $V_P$ across capacitance 1686 is applied through a voltage divider formed by a resistance 1696 and resistance 1698 to a reference voltage junction 1700 which is clamped at −0.7 volt by a diode 1702 to ground and a resistance 1704 to the negative voltage terminal. The junction between the resistances 1696 and 1698 is connected to the inverting input of an operational amplifier 1706 which has a feedback capacitance 1708 to form an integrator which produces the control voltage $V_{C1}$ on line 1712. The resistances 1696 and 1698 are selected so that the peak voltage $V_P$ across capacitance 1686 is maintained at a suitable value such as 1.6 volts. A zener diode 1710 to the negative voltage supply clamps $V_{C1}$ at about −4 volts to limit the control current from amplifier 1706 to be less than about 0.6 milliamps when there is no input data.

The scaling amplifier 1610 converts the first control voltage $V_{C1}$ into the second control voltage $V_{C2}$ so that the frequency dependent gain produced by the shaping amplifier 1604 closely tracks the voltage dependent attenuation for different cable lengths. The voltage line 1712 is connected by a voltage divider including resistances 1714 and 1716 to the noninverting input of an operational amplifier 1718 which includes a feedback resistance 1720 and a ground biasing resistance 1722 connected to the inverting input of the amplifier 1718 for producing a suitable gain. A reference offset voltage is applied through resistance 1716 from the junction between a zener diode 1724 connected to ground and a resistance 1726 connected to the positive voltage supply. At minimum cable lengths, when the voltage $V_{C1}$ will be about 0, frequency dependent attenuation will be introduced by the low pass filtering circuitry in the automatic gain amplifier 1602 and is compensated for by a minimum voltage $V_{C2}$ generated due to the bias applied through zener diode 1724. Additionally, the desired rate of change in frequency dependent gain through amplifier 1672 is greater than the rate of change in flat gain produced by amplifier 1620 for varying lengths of cable. For example, in one embodiment the voltage $V_{C2}$ is offset plus 1.19 volts and has an amplification factor of 1.28 times $V_{C1}$.

The output Vo of the automatic equalizer is coupled by a capacitance 1728 to the noninverting inputs of the comparators 194 and 198 and to the inverting inputs of comparators 196 and 200. These inputs are biased by the junction between resistances 1729 and 1730 which form a voltage divider between the +5 volt supply and ground. The outputs of the comparators 194 and 196 produce the full wave recitified pulses on line 214 of FIGS. 5 and 11 and the outputs of comparators 198 and 200 are connected to the D-inputs of the respective slicing flip-flops 312 and 310 in FIG. 5. A voltage divider formed by series resistances 1731, 1732, 1733, 1734 and 1735 supplies the proper reference voltages to inverting inputs of comparators 194 and 198 and to the noninverting inputs of comparators 196 and 200 to produce the negative and positive thresholds of about 70% peak input voltage for the respective comparators 194 and 196, and to produce the negative and positive thresholds of about 50% peak input voltage for the respective comparators 198 and 200.

Figure 36:
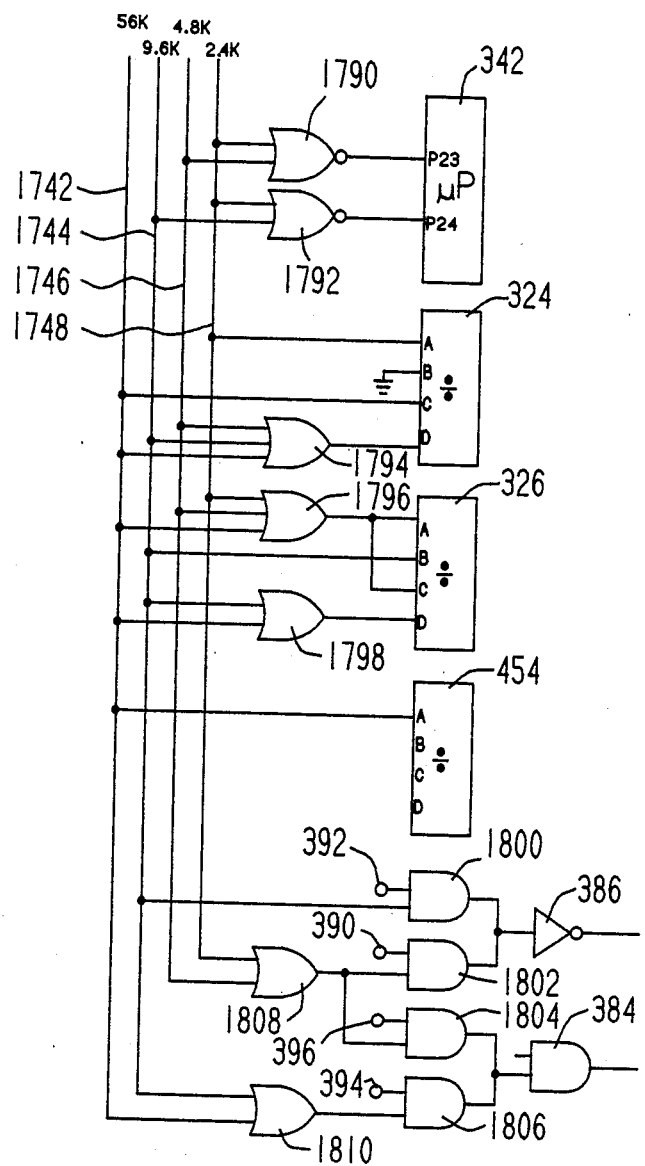
FIG. 36 is a circuit diagram of modifications utilized in the circuits of FIGS. 14 and 18 to enable the manufacture of an office channel unit operating at any of the customer rates.

In order to render the above-identified circuit suitable for manufacture of a single unit which can be set when installed to operate at a selected frequency, various gating circuitry is added as shown in FIGS. 35 and 36 wherein switch means such as a four position switch 1740 is utilized to energize one of four lines 1742, 1744, 1746 and 1748 which are biased by respective resistances 1750, 1752, 1754 and 1756 to ground. The lines 1742, 1744, 1746 and 1748 are utilized to operate gates to produce operation of the office channel unit at 56, 9.6, 4.8 and 2.4 kb/s, respectively.

The switches 1624, 1632, 1645, 1646 and 1670 of FIG. 34 are electronic analog switches. As shown in FIG. 35 an OR gate 1758 has inputs connected to the respective 9.6K control line 1744, 4.8K control line 1746 and 2.4K control line 1748 for operating the switches 1624 and 1670 when the office channel unit is operating in a subrate. An OR gate 1760 operates the switch 1632 and has inputs connected to the 56 k control line 1742, 4.8 k control line, 1746 and 2.4 k control line 1748. The switches 1645 and 1646 are operated by the 56 k control line 1742.

FIG. 35 also contains the modifications for the circuits of FIGS. 2, 9, 10 and 11 for enabling the switch 1740 to select the rate of the regenerated clock pulse produced on line 216 of FIG. 9. The phase lock loop circuit 222 of FIG. 9, the resistance 300 of FIG. 10, the flip-flop 302 of FIG. 11 and the flip-flop 304 of FIG. 2 have inputs connected in common to the 1.344 megahertz network clock line 62. AND gates 1764, 1766, 1768 and 1770 have respective first inputs connected to outputs of the phase lock loop circuit 222 of FIG. 9, resistance 300 of FIG. 10, flip-flop 302 of FIG. 11 and flip-flop 306 of FIG. 2 with second inputs of these AND gates connected to the respective control lines 1742, 1744, 1746 and 1748. The outputs of the AND gates 1764, 1766, 1768 and 1770 are connected to respective inputs of an OR gate 1772 which has its output driving the multiplied clock signal line 225 to produce the respective 5.376 megahertz, 1.344 megahertz, 0.672 megahertz and 0.336 megahertz, respectively, signals. Additionally, the lines 1742, 1746 and 1748 are connected to respective disable inputs of the phase lock loop 222, flip-flop 302 and flip-flops 304 and 306, respectively. In order to enable division of the clock signal on line 225 by 96 at the 56 kb/s rate, and by 140 at the 9.6, 4.8 and 2.4 kb/s rates, an OR gate 1774 having inputs connected to lines 1744, 1746 and 1748 is connected to the A preset input of divider 238 and the C preset input of divider 236, while the line 1742 is connected to the D preset input of divider 236 so that, at the 56 kb/s rate the input of divider 236 presets to 10, and the divider 238 presets to 8, while at the subrates the divider 236 presets to 6 and the divider 238 presets to 9. The counters 236 and 238 count upwards so that at 56 kb/s counters 236 and 238 divide the incoming pulses by 48 which with flip-flop 240 of FIG. 9 produces a division of 96, and at the subrate the dividers 236 and 237 divide the incoming pulses by 70 to produce a division with flip-flop 240 of 140.

Modifications of the output circuit 54 of FIG. 3 are also shown in FIG. 35 in order to enable this circuit to operate at all four rates. An electronic switch 1776 is connected in series with the low band pass filter capacitance 682 and is closed by an OR gate 1778 with inputs driven from lines 1744, 1746 and 1748 so that the low band pass filter is disabled at the high frequency rate of 56 kb/s A supplemental capacitance 1780 is connected in parallel with the capacitance 684 by an electronic analog switch 1782 driven by the line 1748 so that the appropriate low band pass filtering is produced at the 2.4 kb/s. The 28 KHz band elimination required at 9.6 and 4.8 kb/s in the output circuit of FIG. 3 is produced by the band pass filter with inverted output from amplifier 702. In the modification of FIG. 35 the inputs and outputs of this band pass filter circuit are connected through respective electronic analog switches 1784 and 1786 which are driven by the output of an OR gate 1788 with inputs driven by the 9.6K control line, 1744 and the 4.8K control line 1746.

The straps 524 and 526 of FIG. 17 for indicating the customer rate to the microprocessor 342, are replaced in FIG. 36 by NOR gates 1790 and 1792 having respective outputs connected to the corresponding input lines to the microprocessor 342. The NOR gate 1790 has inputs driven by the 4.8K control line 1746 and the 2.4K control line 1748, while the NOR gate 1792 has inputs connected to the 9.6K control line 1744 and the 2.4K control line 1748.

In the clock generation circuit of FIG. 14, the connections to the preset inputs of counters 324 and 326 include gate circuitry modifications shown in FIG. 36 so that the counters respond to one of the energized lines 1742, 1744, 1746 or 1748 to produce the appropriate clock rate. These connections for the counter 324 include connecting the A preset input to line 1748, connecting the C input to line 1742, and inserting an OR gate 1794 with its output connected to the D preset input and having inputs connected to line 1742, 1744 and 1746. For the counter 326, an OR gate 1796 having inputs connected to line 1742, 1746 and 1748 drives both the A and C preset inputs while the B input is connected to line 1744 and the D input is driven by an OR gate 1798 having inputs connected to line 1742 and 1744. The jumper connections for inverter 386 and AND gate 384 of FIG. 14 are modified by inclusion of AND gates 1800, 1802, 1804 and 1806. The AND gate 1800 is operated by the 9.6K control line 1744 and is connected between the terminal 392 and the input of the inverter 386. The AND gate 1802 is connected between the terminal 390 and inverter 386, and is operated by an OR gate 1808 having inputs connected to the 4.8K control line 1746 and the 2.4K control line 1748. The AND gate 1804 is connected between terminal 396 and one input of the AND gate 384 with its control input connected to the output of OR gate 1808. AND gate 1806 is connected between terminal 394 and the control input of AND gate 384, and the control input of AND gate 1806 is operated by OR gate 1810 having inputs connected to 56K control line 1742 and 9.6K control line 1744. Additionally, the counter 454 of FIG. 18 has its A preset input connected to the control line 1742 as shown in FIG. 36 so that the counter 454 will count seven customer input pulses at the 56 kb/s rate, while only counting six input pulses at the subrates.

In another embodiment (not shown) of the invention, various circuits including counting and logic circuitry shown in FIGS. 9, 14, 18, 19, 35 and 36 are incorporated in a custom integrated circuit unit in accordance with conventional practice.

Since many modifications, variations and changes in detail may be made to the above described embodiments without departing from the scope and spirit of the invention, it is intended that all matter in the foregoing description and shown in the accompanying drawings be interpreted as illustrative and not in a limiting sense.

What is claimed is:

1. A digital subscriber loop termination device comprising
    network input means for receiving a network sync pulse and N serial input bits of network data at a network bit rate $F_N$ and for converting the N serial input bits into a network input parallel word in synchronism with the network sync pulse;
    customer input means for receiving C serial input bits of bipolar customer data at a customer bit rate $F_C$ and for converting the C serial input bits into a customer input parallel word;
    means for generating a customer data sync pulse in synchronism with the customer input means receiving the C serial input bits;
    network output means for generating N serial output bits of binary network data at the network bit rate $F_N$ from a network output parallel word in synchronism with the network sync pulse;
    customer output means for generating C serial output bits of bipolar customer data at the customer bit rate $F_C$ from a customer output parallel data word in synchronism with the customer sync pulse; and
    computer means responsive to the network sync pulse and connected to both of the input means and to both of the output means for (a) reading the customer input parallel word from the customer input means, (b) reading the network input parallel word from the network input means, (c) passing the network input parallel word as a customer output parallel word to the customer output means, and (d) passing the last read customer input parallel word as a network output parallel word to the network output means, wherein (a), (b) and (c) are in synchronism with the customer data sync pulse.

2. A digital subscriber loop termination device as claimed in claim 1 wherein the computer means is such that (a), (b), (c) and (d) are performed within a duration less than the duration between successive network sync pulses.

3. A digital subscriber loop termination device as claimed in claim 1 wherein
    the value of N is greater than C and one bit of each N serial network input and output bits signifies a data word when in a first state and signifies a control word when in a second state;
    the customer input means includes means responsive to a bipolar violation in the serial input bits of customer data to produce a control code indicating bit in the customer input parallel word;
    the computer means includes a table of network control code words corresponding to respective customer control codes, and means responsive to a control code indicating bit in the customer input parallel word for selecting the corresponding network control code and passing the network control code as a network output parallel word to the network output means; and
    the customer output means includes means detecting a control code indicating bit in the customer output parallel word for producing a bipolar violation in the serial output bits being generated.

4. A digital subscriber loop termination device as claimed in claim 1 including loopback means for disconnecting the customer input and output means from respective customer input and output lines and for connecting the customer output means to the customer input means, and wherein the computer means includes means responsive to a network input parallel word corresponding to a loopback code for operating the loopback means.

5. A digital subscriber loop termination device as claimed in claim 1 including selection means for selecting operation of the device at one of a plurality of different customer bit rates wherein at one of the customer bit rates the value of $F_N$ is at least R times the network bit rate; and wherein the computer means includes means responsive to the selecting means selecting operation at the one customer frequency for counting R network sync pulses and for performing (a), (b) and (c) only once every R network sync pulses.

6. An office channel unit comprising
network input means for receiving a network sync pulse and N serial input bits of binary network data at a network bit rate $F_N$ and for converting the N serial input bits into a network input parallel word in synchronism with the network sync pulse;
customer input means for receiving C serial input bits of bipolar customer data at a customer bit rate $F_C$ and for converting the C serial input bits into a customer input parallel word;
means for generating a customer data sync pulse in synchronism with the customer input means receiving the C serial input bits;
the values of N, $F_N$, C and $F_C$ having the relationship:

$$R = \frac{F_N \cdot C}{F_C \cdot N}$$

wherein R is an integer;
network output means for generating N serial output bits of binary network data at the network bit rate $F_N$ from a network output parallel word in synchronism with the network sync pulse;
customer output means for generating C serial output bits of bipolar customer data at the customer bit rate $F_C$ from a customer output parallel data word in synchronism with the customer sync pulse; and
computer means responsive to the network sync pulse and connected to both of the input means and to both of the output means for (a) reading the customer input parallel word from the customer input means, (b) reading the network input parallel word from the network input means, (c) passing the network input parallel word as a customer output parallel word to the customer output means, and (d) passing the last read customer input parallel word as a network output parallel word to the network output means, wherein (a), (b) and (c) are in synchronism with the customer data sync pulse.

7. An office channel unit as claimed in claim 6 wherein the computer means is such that (a), (b), (c) and (d) are performed within a duration less than the duration between successive network sync pulses.

8. An office channel unit as claimed in claim 6 wherein
the value of N is greater than C and one bit of each N serial network input and output bits signifies a data word when in a first state and signifies a control word when in a second state;
the customer input means includes means responsive to a bipolar violation in the serial input bits of customer data to produce a control code indicating bit in the customer input parallel word;
the computer means includes a table of network control code words corresponding to respective customer control codes, and means responsive to a control code indicating bit in the customer input parallel word for selecting the corresponding network control code and passing the network control code as a network output parallel word to the network output means; and
the customer output means includes means detecting a control code indicating bit in the customer output parallel word for producing a bipolar violation in the serial output bits being generated.

9. An office channel unit as claimed in claim 6 including loopback means for disconnecting the customer input and output means from respective customer input and output lines and for connecting the customer output means to the customer input means, and wherein the computer means includes means responsive to a network input parallel word corresponding to an office channel unit loopback code for operating the office channel unit loopback means.

10. An office channel unit as claimed in claim 6 including selection means for selecting operation of the office channel unit at one of a plurality of different customer frequencies wherein at one of the customer frequencies the value of R is greater than 1; and wherein the computer means includes means responsive to the selecting means selecting operation at the one customer frequency for counting R network sync pulses and for performing (a), (b) and (c) only once every R network sync pulses.

11. An office channel unit as claimed in claim 6 wherein $F_N$ is 64 kilobits per second; $F_C$ is 2.4, 4.8, 9.6 or 56 kilobits per second; N is 8; and C is 6 if $F_C$ is 2.4, 4.8 or 9.6 kilobits per second or is 7 if $F_C$ is 56 kilobits per second.

12. An office channel unit as claimed in claim 10 wherein $F_N$ is 64 kilobits per second; $F_C$ is 2.4, 4.8, 9.6 or 56 kilobits per second; N is 8; and C is 6 if $F_C$ is 2.4, 4.8 or 9.6 kilobits per second or is 7 if $F_C$ is 56 kilobits per second.

* * * * *

UNITED STATES PATENT AND TRADEMARK OFFICE
CERTIFICATE OF CORRECTION

PATENT NO. : 4,748,637

DATED : May 31, 1988

INVENTOR(S) : Larry D. Bishop and Larry A. Jackson

It is certified that error appears in the above-identified patent and that said Letters Patent is hereby corrected as shown below:

Column 30, line 33, before --is connected-- delete "15".

Signed and Sealed this

Twenty-second Day of November, 1988

*Attest:*

*Attesting Officer*

DONALD J. QUIGG

Commissioner of Patents and Trademarks